(12) United States Patent
Weinstock et al.

(10) Patent No.: US 7,970,859 B2
(45) Date of Patent: Jun. 28, 2011

(54) ARCHITECTURE AND METHOD FOR REMOTE PLATFORM CONTROL MANAGEMENT

(75) Inventors: Neil Weinstock, Randolph, NJ (US); Michael Baumann, Zwickau (DE); Swen Anderson, Saxony (DE); Rolf Fiedler, Berlin (DE)

(73) Assignee: Raritan Americas, Inc., Somerset, NJ (US)

( * ) Notice: Subject to any disclaimer, the term of this patent is extended or adjusted under 35 U.S.C. 154(b) by 551 days.

(21) Appl. No.: 11/937,867

(22) Filed: Nov. 9, 2007

(65) Prior Publication Data
US 2009/0013056 A1 Jan. 8, 2009

Related U.S. Application Data

(60) Provisional application No. 60/857,852, filed on Nov. 9, 2006.

(51) Int. Cl.
*G06F 13/14* (2006.01)
*G09G 5/36* (2006.01)

(52) U.S. Cl. ........ 709/217; 345/519; 345/520; 345/545; 345/547

(58) Field of Classification Search .................. 709/223, 709/224, 217; 345/547, 449, 519, 520, 545
See application file for complete search history.

(56) References Cited

U.S. PATENT DOCUMENTS

| 6,701,380 | B2* | 3/2004 | Schneider et al. | 709/250 |
| 6,774,904 | B2* | 8/2004 | Emerson et al. | 345/547 |
| 6,959,042 | B1* | 10/2005 | Liu et al. | 375/240.02 |
| 7,233,619 | B1* | 6/2007 | Roman | 375/240 |
| 7,365,757 | B1* | 4/2008 | Callway et al. | 345/629 |
| 2005/0044186 | A1* | 2/2005 | Petrisor | 709/219 |

* cited by examiner

*Primary Examiner* — Krisna Lim

(57) ABSTRACT

An integrated circuit is a baseboard management controller that is a fully integrated system-on-a-chip microprocessor incorporating function blocks and interfaces that provide remote management solution. The integrated circuit uses a microprocessor, a media co-processor to accelerate video processing, and a set of system and peripheral functions that are useful in a variety of remote management applications. It further includes an integrated USB high-speed device and an OTG interface to support keyboard, mouse and mass storage emulation without additional external components, and two integrated MII LAN interfaces and one FSB interface, a memory controller to support a variety of static and dynamic memory components, an encryption controller to ensure secure remote management sessions and IPMI2.0-compliant BMC interfaces. The integrated circuit is based on structured ASIC technology, which enables easy customization of function blocks according to customer demands or new industry standards.

19 Claims, 13 Drawing Sheets

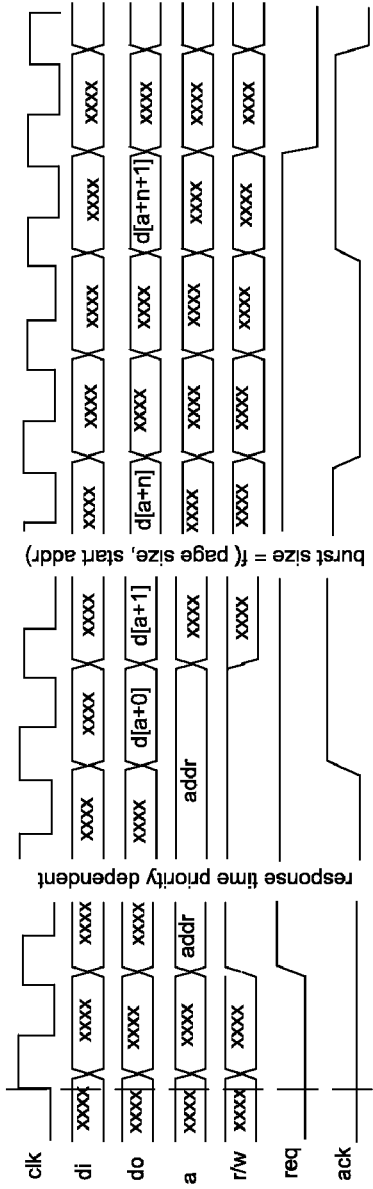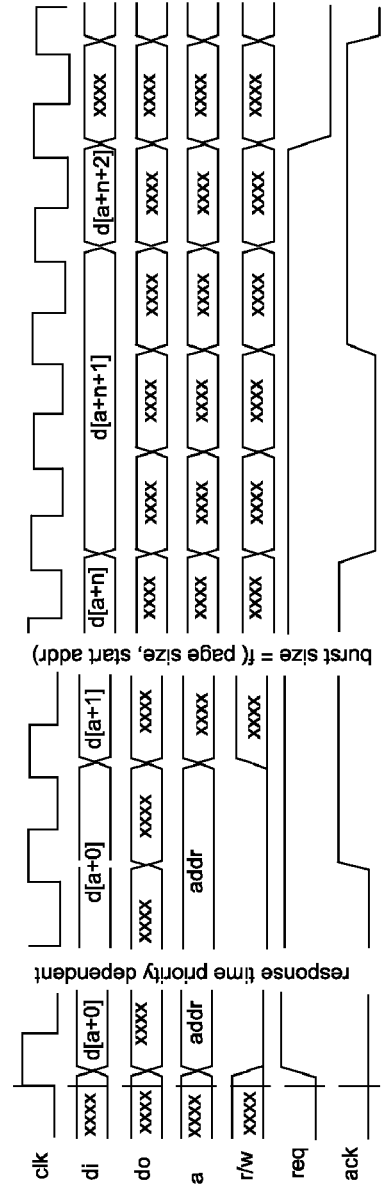

ARCHITECTURE AND METHOD FOR REMOTE PLATFORM CONTROL MANAGEMENT

CROSS-REFERENCE TO RELATED APPLICATION

This application claims the benefit of U.S. Provisional Application Ser. No. 60/857,852, filed Nov. 9, 2006, the disclosure of which is incorporated herein by reference.

FIELD OF THE INVENTION

The invention relates to an integrated circuit architecture and method for providing platform control access and management of remote devices such as servers. The inventive system on a chip combines keyboard, mouse, and video over Internet Protocol (KVM-over-IP) technology with multiple platform management access technologies.

BACKGROUND OF THE INVENTION

The administration and management of networked servers has become increasingly more complex as file, email, Web and application servers proliferate on corporate Local Area Networks (LANs). Although these servers, unlike personnel computers, typically do not have their own keyboard, mouse and video (KVM) consoles, they still need to be configured, maintained, updated and occasionally rebooted to maintain proper operation of the LAN.

KVM systems enable a local user KVM console to remotely access and control multiple servers. Specifically, a KVM system allows the user to control a remote server using the user's local workstation's keyboard, video monitor, and mouse as if these devices were directly connected to the remote server. In this manner, the user can access and control a plurality of remote servers from a single location.

BRIEF SUMMARY OF THE INVENTION

An integrated circuit according to the principles of the invention is a baseboard management controller (BMC) that is a fully integrated system-on-a-chip microprocessor which incorporates function blocks and interfaces necessary to provide a complete and cost-effective remote management solution that fits all server management architectures. The integrated circuit is based on a 32-bit, high-performance, low power microprocessor and is equipped with a media co-processor to accelerate video processing, and a comprehensive set of system and peripheral functions that are useful in a variety of remote management applications.

A part of the integrated chip ASIC is based on structured ASIC technology, which enables easy customization of function blocks according to customer demands or new industry standards.

The integrated circuit minimizes server downtime and increases IT productivity by enabling remote operating system installation, BIOS upgrade and power cycling on a server. In addition, since the integrated circuit is an application-specific integrated circuit (ASIC), board space and system costs are reduced. The integrated circuit supports all standardized access protocol methods in the marketplace, including Intelligent Platform Management Interface (IPMI), Secure Shell (SSH), Web Services Based Management Protocol (WS-Management) and Systems Management Architecture for Server Hardware-Command Line Protocol (SMASH-CLP). The integrated circuit provides virtual media support that covers a broad range of mass storage emulation variations including virtual-floppy emulation, CD/DVD-drive emulation and direct mass-storage redirection. Additionally, it offers features to prevent downtime, such as health management consisting of IPMI 2.0-based server hardware monitoring.

The integrated chip is the manageability engine for different types of cards that support common platform interface standards, such as Open Platform Management Architecture (OPMA) and Advanced System Management Interface (ASMI).

BRIEF DESCRIPTION OF THE DRAWINGS

In the drawings:

FIG. 5 is an exemplary read cycle diagram.

FIG. 6 is an exemplary write cycle diagram.

DETAILED DESCRIPTION OF THE INVENTION

I. Integrated Chip Block Design

In general, the invention is an integrated system-on-a-chip microprocessor for application and use in remote monitor/control systems. The invention uses a high-performance, low power microprocessor. It is equipped with a media coprocessor to accelerate video processing and a comprehensive set of system and peripheral functions to be useful in a variety of remote monitor/control applications.

The integrated circuit may include a microprocessor 16 kByte data/instruction cache, running at a maximum clock speed of 200 MHz, and a Video Sampling Controller (VSC) function block to accelerate video processing and compression for outstanding KVM-over-IP performance (30 fps) and for supporting maximum video resolutions of up to 1600× 1200@75 Hz. The integrated circuit further provides an integrated USB high-speed device and an OTG interface with built-in USB-PHY to support keyboard, mouse and mass storage emulation without additional external components, and two integrated MII LAN interfaces and one FSB interface to support dedicated, as well as shared, NIC server architectures. It further features a flexible high-performance memory controller to support a variety of static and dynamic memory components, including serial flash components (SPI). It has an integrated AES/3DES-compliant encryption controller to ensure secure remote management sessions and IPMI2.0-compliant BMC interfaces, which include UART, LPC, I2C, Tacho, PWM and GPIO interfaces.

The integrated circuit is an application-specific structured ASIC product for peripheral interface applications. It provides the benefits of a fully verified microprocessor platform, as well as Ethernet and USB 2.0 connectivity. To support the advanced power saving functions and the control that fits industrial standard, the integrated chip provides an 8-channel ADC for measurement of specific functions. It also provides a large, flexible structured ASIC region for customer-specific functions. The common application areas for the integrated circuit include industrial automation, consumer electronics, and communication-centric devices.

Figure 1:
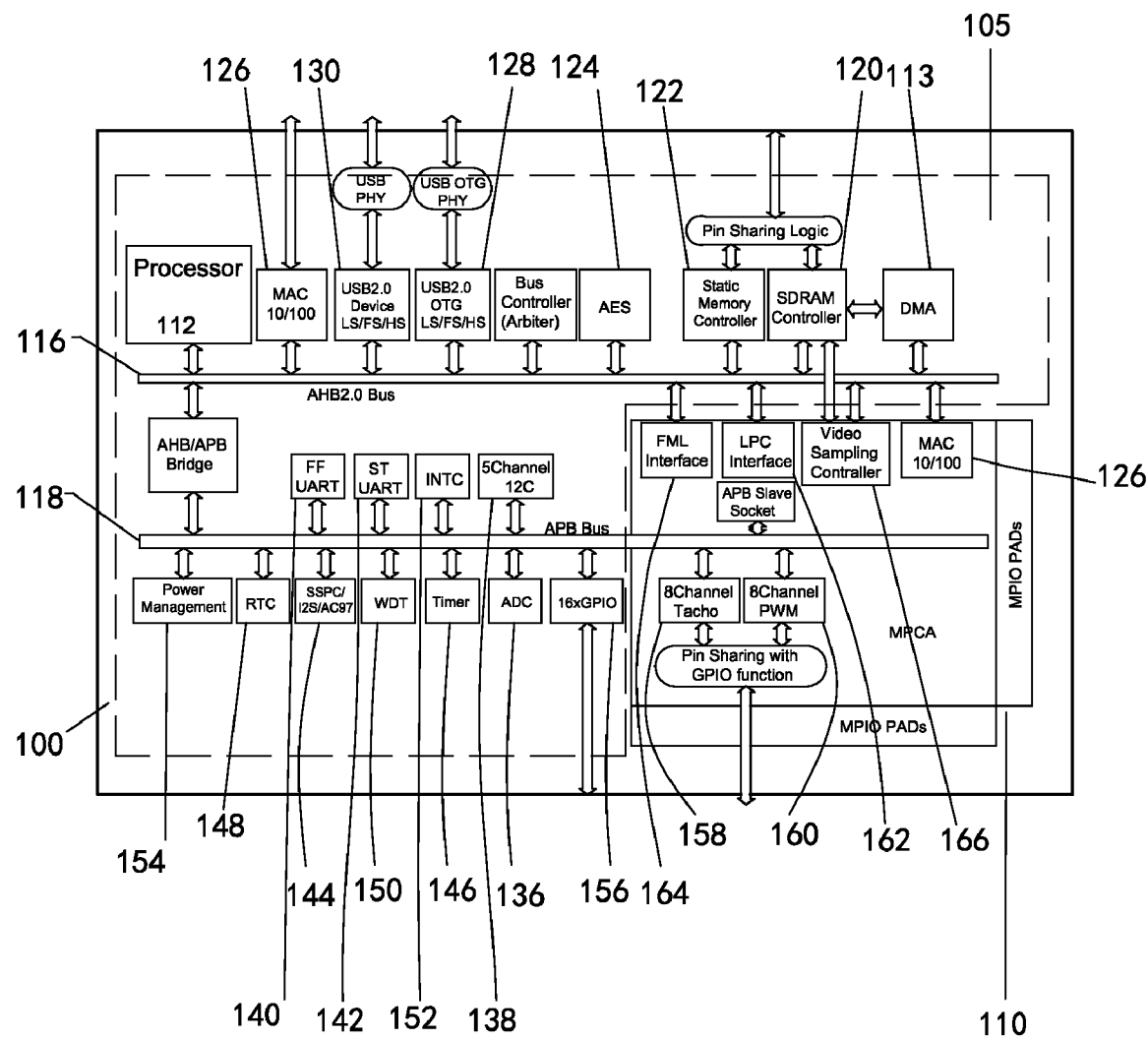
FIG. 1 is a block diagram of an exemplary integrated chip.

Referring to FIG. 1, an exemplary integrated circuit 100 consists of two blocks: a CPU-based fixed body 105 and a Three-Metal Programmable Cell Array (3 MPCA) body 110. CPU-based fixed body 105 has been fully designed and verified to spare the users the trouble of having to develop and debug the micro-controller portion of the system. 3 MPCA body 110 allows the users to integrate their designs to expand the specific application.

Exemplary integrated on-chip components include an embedded processor 112, a system bus 115 that is compliant with AMBA Spec. Rev 2.0 and includes an AMBA-AHB bus 116 for high speed devices and an AMBA-APB bus 118 for low speed devices.

In CPU-based fixed body 105, AMBA-AHB bus 116 handles Synchronous Dynamic Random. Access Memory (SDRAM) Controller (SDMC) 120, Static Memory Controller (SMC) 122, AES-DES Cipher Coprocessor (AES) 124, 10/100 MAC Controller (MAC) 126, USB 2.0 OTG Controller with PHY (USB2.0 OTG) 128, USB 2.0 Device Controller with PHY (USBD 2.0) 130, Direct Memory Access Controller (DMAC) 132 and External memory bus interface (EBI) 134.

In CPU-based fixed body 105, AMBA-APB bus 118 handles 8-channel multiplexed Analog-to-Digital Converter (ADC) 136, 5-channel I²C Controller (I²C) 138, 1-channel 16550-compatible Universal Asynchronous Receiver/Transmitter (UART) 140, 1-channel UART Controller with auto-flow-control function for RS485 142, AC97/12S/SPI/SSP Controller 144, 3-channel Internal Timer 146, Real Time Clock (RTC) 148, Watch Dog Timer (WDT) 150, 32-channel Interrupt Controller (INTC) 152, Power & Clock Management 154, and up to 32-bit General Purpose I/O (GPIO) 156.

The following devices are in 3 MPCA body 110: 8-channel TACHO Meter 158, 8-channel Pulse Width Modulator 160, LPC 162, FML 164, VSC 166 and 10/100 MAC Controller (MAC) 126 and are discussed in more detail below.

Nominal operating characteristics for integrated chip 100 include an operating frequency of 200 MHz. The clock for AMBA-AHB bus 116 is a half of the CPU clock and the clock for AMBA-APB bus 118 is a half of the AMBA-AHB clock.

Each of the components discussed above is now described in more detail. Embedded processor 112 can be a general-purpose 32-bit embedded RISC processor such as the ARM-based 32-bit RISC with 16 KB I-Cache/16 KB D-Cache 920T ARM Architecture V4 microprocessor. It can include a CPU core, separate instruction/data caches (16K bytes each, 2-way set-associated), separate instruction/data scratchpad (16K bytes each), a write buffer (8 words for data/address each), a Memory Management Unit (MMU) and a Multi-ICE interface. The CPU core can be a Harvard architecture design with six-stage pipeline consisting of Fetch, Decode, Shift, Execute, Memory and Write stages. In order to reduce the branch penalties, embedded processor 112 also contains a Branch Target Buffer (BTB) to improve the overall performance. The MMU implements an enhanced ARM architecture V4 MMU to provide translation and access permission checks for the instruction and data address ports of the embedded processor 112. Embedded processor 112 implements the ARM architecture up to 190 MHz with low operating power.

SDRAM Controller (SDMC) 120 supports four 8-, 16- and 32-bit-wide banks. The SDMC performs auto-refreshing (CBR) during normal operation. It shares the address/data bus with Static Memory Controller (SMC) 122. SDMC 120 includes zero-wait-state write, 8-word data FIFO, wide address range up to 2G, rich types of SDRAM, programmable refresh controller, programmable refresh scheme (staggered/non-staggered), and four (4) external banks.

Static Memory Controller (SMC) 122 supports flash memory, SRAM, or ROM. Each chip-select can be individually configured to an 8-, 16- or 32-bit-wide data bus. SMC 122 shares the address/data bus with SDMC 120. The SMC 122 includes zero-wait-state write, 8-word data FIFO, ROM, FLASH, burst-ROM, asynchronous SRAM, four (4) external banks, wide address range up to 256 M bytes and programmable/jumper set external memory bus width (8-, 16-, 32-bit).

10/100 Ethernet MAC (MAC) 126 is a high quality 10/100 Ethernet controller with DMA functions. It includes an AHB wrapper, a DMA engine, on-chip memory (TX FIFO and RX FIFO), MAC, and an MII interface. MAC 126 supports MII interface, DMA engine for transmitting and receiving packets, programmable AHB burst size, transmit and receive interrupt mitigation mechanism, two (2) independent FIFOs (2K bytes each for TX and RX), half and full duplex modes, and flow control for full duplex and backpressure for half duplex.

USB OTG2.0 Controller (USB OTG 2.0) 128 is a universal serial bus (USB) 2.0 On-The-Go (OTG) controller, that can play a dual-role as a host and peripheral controller. The USB OTG 2.0 supports UTMI+level 2 compliant transceiver, EHCI 1.0 interface compliant, USB specification revision 2.0 interface compliant, On-The-Go Supplement to USB 2.0 specification revision 1.0 interface compliant, OTG SRP and HNP compliant, point-to point communications with HS/FS/LS devices, EHCI data structures compliant, and embedded DMA access to FIFO. Controller 128 supports suspend mode, remote wake-up and resume. Both host and device supports isochronous/interrupt/control hulk transfers.

USB 2.0 Device Controller (USBD 2.0) 130 is a universal serial bus device controller used as an interface with USB devices based on the Universal Serial Bus 2.0 specification. Controller 130 operates at high speed signaling bit rate of 480 Mb/s and full speed signaling bit rate of 12 Mb/s. Each endpoint, except endpoint 0, can program the transfer type for isochronous, bulk, or interrupt transfer. Controller 130 is USB 1.1 compliant, USB protocol revision 2.0 full speed/high speed compatible, programmable transfer type and direction for each endpoint, four (4) (except endpoint 0) endpoints, 7K-byte FIFOs for bulk, isochronous and high-bandwidth interrupt endpoint, 2*64-byte FIFOs for non-high-bandwidth interrupt endpoint, 64-byte FIFOs for endpoint 0, and maintenance of data toggle bits. Controller 130 supports chirp sequences, isochronous, bulk, interrupt and control transfers, suspend mode, remote, wake-up and resume functions and automatic CRC5/CRC16 generation and check.

Direct Memory Access Controller (DMA) 132 enhances system performance and reduces processor-interrupt generation. System efficiency is improved by employing high-speed data transfers between the system and device. DMA 132 provides up to eight (8) configurable channels for memory-to-memory, memory-to-peripheral, and peripheral-to-memory transfers with the shared buffer. DMA 132 features eight (8) DMA channels, chain transfer support, hardware handshake support, AMBA specification (rev 2.0) compliant, eight (8) DMA requests/acknowledges, memory-to-memory, memory-to-peripheral, and peripheral-to-memory transfers, and group round robin arbitration scheme with four (4) priority levels, 8-, 16- and 32-bit data width transaction.

AES-DES Cipher Coprocessor (AESC) 134 provides an efficient hardware implementation of DES and Triple DES/AES algorithms for high performance encryption and decryption which can be applied to various applications. The AESC includes block cipher mode supports, DES and Triple DES encryption/decryption compatible with NIST standard, and AES 128/192/256-bit encryption/decryption compliant with NIST standard. AESC operate in multiple encryption modes. For example, 1) DES and Triple-DES operates in ECB mode, CBC mode, CFB mode and OFB mode and 2) AES operates in ECB mode, CBC mode, CFB mode, OFB mode and CTR mode, and provides a DMA function.

External Bus Interface (EBI) 136 has a shared memory interface, provides access to SDRAM 120, provides access to SRAM/ROM/FLASH, and provides access to Variable Latency I/O Devices.

ADC 136 runs at a superior maximum sampling frequency rate of 200 KHz, with a 10-bit resolution capability. It uses cyclic architecture that can be used in a wide range of high-resolution applications. A single clock input is used to control all internal conversion cycles. ADC 136 includes a maximum conversion rate of 4200 KHz, a maximum clock rate of 2.65.2 MHz, and supports power down mode, built-in power-down mode, and eight (8) switch channels I$^2$C Controller 138 is a two-wire bidirectional serial bus that provides a simple and efficient method of data exchange while minimizing the interconnection between devices. I$^2$C bus interface controller 138 allows the host processor 112 to serve as a master or slave residing on I$^2$C bus 138. Data is transmitted to and received from I$^2$C 138 bus via a buffered interface. I$^2$C bus 138 features programmable slave address, and supports standard and fast modes through programming the clock division register, 7-bit, 10-bit and general call addressing modes, glitch suppression throughout the de-bounce circuits, Master-transmit, Master-receive, Slave-transmit and Slave-receive modes and Slave mode general call address detection.

Integrated circuit 100 supports two (2) UARTs, a Full Function UART 140 (FFUART), and a Console UART 142. The two (2) UARTs use the same programming model. FFUART 140 supports modem control capability. UART 142 does not provide any modem control pins but includes an RTSn pin to control RS485 data direction. The UARTs can be a high-speed NS 16C550A-compatible UART, and have programmable baud rates up to 115.2 Kbps. UARTs 140 and 142 can add or delete standard asynchronous communications bits (start, stop, and parity) in serial data. The programmable baud rate generator allows the internal clock to be divided by 1 to (216-1) to generate an internal 16× clock. It further includes a fully programmable serial interface including i) 5-, 6-, 7-, or 8-bit characters, ii) even, odd, and no parity detection, and iii) 1, 1.5, or 2 stop bit generation. It has complete status reporting capability, can generate and detect line breaks, fully prioritized interrupt system controls, and separate DMA requests for transmit and receive data services. FFUART 140 provides 16-byte transmit FIFO and 16-byte receive FIFO and UART 142 provides 16-byte transmit FIFO and 16-byte receive FIFO.

Synchronous Serial Port Controller (SSPC) 144 is a synchronous serial port interface that allows host processor 112 to serve as a master or slave. It can connect to various kinds of devices using serial protocol such as Texas Instrument Synchronous Serial Port (SSP), Motorola Serial Peripheral Interface (SPI), National Semiconductor MICROWIRE, Philips I$^2$S, and Intel AC-link. Serial data formats may range from 4 to 32 bits in length. The synchronous serial port can use on-chip DMA to transfer data directly between external serial device and system memory without processor intervention.

SSPC 144 has independent SSP clock to ease bit-clock generation, a Master/Slave mode, internally or externally controlled serial bit clock, internally or externally controlled frame/sync, programmable frame/sync polarity, and a programmable serial bit clock polarity, phase, and frequency. It further includes a programmable serial bit data sequence (MSB or LSB first), a programmable I$^2$S format (including zero bit padding and right or left justification), a programmable threshold interrupt of transmit/receive FIFO, an independently programmable interrupt enable/disable, and an independently configurable transmit and receive data FIFO depth.

Timer 146 provides three (3) independent sets of timers. Each timer can use either internal system clock (PCLK) or external clock (32.768 KHz) for decrement counting. Two match registers are provided for each timer. Timer 146 includes three (3) independent 32-bit timer programming models, internal or external clock source selection, overflow and time-up interrupts, and a decrement counting mode.

Real Time Clock (RTC) 148 provides a basic alarm function or long time-based counter. RTC 148 is set to 1 Hz output and is utilized as a system timekeeper. It also serves as an alarm that generates an interrupt signal. RTC 148 features separate second, minute, hour and day counters to reduce power consumption and software complexity, programmable daily alarm with interrupt, once-per-second, once-per-minute, once-per-hour, and once-per-day interrupts and 6-bit second counter, 6-bit minute counter, 5-bit hour counter, and 16-bit day counter.

Watch Dog Timer (WDT) 150 is used to prevent system from infinite looping if the software becomes trapped in a deadlock. In normal operation, the user restarts WDT 150 at regular intervals before the counter counts down to zero. WDT 150 generates one or a combination of the following signals: reset, interrupt or external signal. WDT 150 features 32-bit down counter, access protection, output one or a combination of: system reset, system interrupt and external interrupt upon timeout, PCLK or 32.768 KHz source selection and variable timeout period of reset.

Interrupt Controller (INTC) 152 provides both FIQ and IRQ modes to microprocessor. It also determines whether the interrupts cause an IRQ or an FIQ to occur and masks the interrupts. The INTC features up to thirty-two (32) fast interrupt (FIQ) inputs and standard interrupt (IRQ) inputs, provide both edge and level triggered interrupt source with positive and negative directions, supports de-bounce circuit for interrupt input sources, and independent interrupt source enable/disable.

Pulse Width Modulator (PWM) 160 has eight (8) pulse width channels. They operate independently from each other, based on their own set of registers. PWM 160 features 10-bit pulse control, eight (8) Pulse Width Modulator channels and enhanced period control through 6-bit Clock divider and 10-bit period counter TACHO Meter (TAM) 158 is used to count the number of rising edges of the external signal in a specified period. The value in the counter register of each channel can be read out for calculating the clock frequency of the external signal. Every channel has an alert flag that will be set when the clock frequency of the external signal is over or below the predefined boundary or counter is overflow. TAM 158 supports up to eight (8) channel measurement.

Power & Clock Management 154 has frequency change control, clock gating control, normal operation, turbo mode and sleep mode.

LPC interface 162 supports LPC interface I/O read cycles and I/O write cycles. It includes three control signals: clock, reset and frame; and three register sets comprising data and status registers. It supports version 1.5 and 2.0 of the Intelligent Platform Management Interface (IPMI) and Channel 3 supports the SMIC interface, KCS interface, and BT interface.

Integrated circuit 100 provides 16 dedicated ports and 16 multiplexed ports for the general-purpose input/output functions. Users can control each one of the sixteen multiplexed ports as a general-purpose input/output port or as a device-controller function port for MPCA design. A second control register provides the selection of the 31 dedicated ports or the 31 multiplexed ports for the general-purpose input/output functions. Users can control each one of the thirty-one multiplexed ports as a general-purpose input/output port or as a normal device-controller function embedded in the fixed part design.

Figure 2:
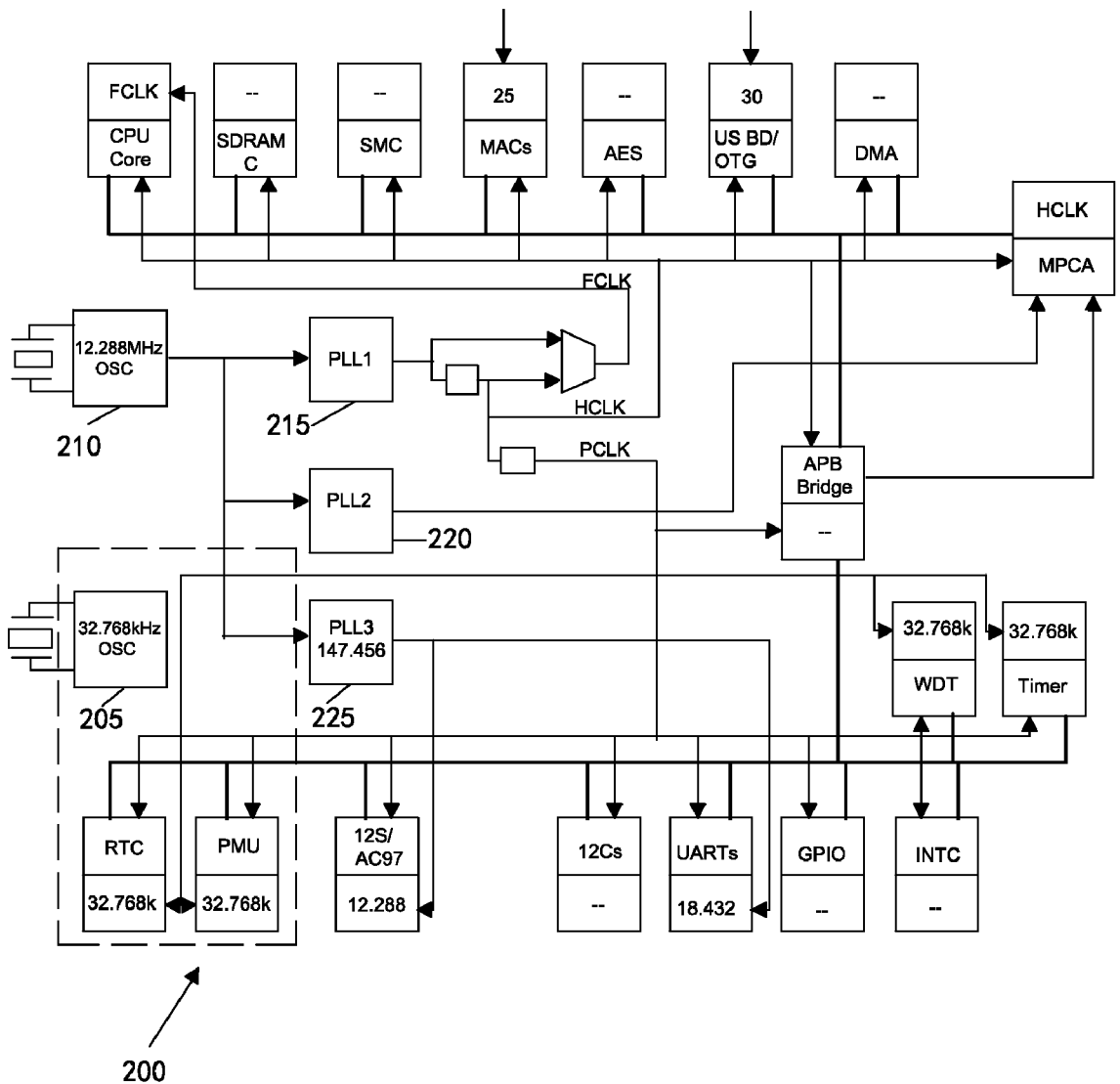
FIG. 2 is an exemplary clocking block diagram for FIG. 1.

Referring now to FIG. 2, there is shown a Clock Manager 200. Clock Manager 200 of integrated circuit 100 incorporates six (6) major clock sources: 32.768 kHz Oscillator 205, a 12.288 MHz Oscillator 210, a Programmable Frequency Core PLL (PLL1) 215, a Programmable Frequency Peripheral PLL (PLL2) 220, a 147.456 MHz Fixed Frequency PLL (PLL3) 225 and a DLL for SDRAM clock de-skew 230.

II. Video Sampling Controller i. Overview

Integrated chip 100 further includes a video sampling controller ("VSC") 166. VSC 166 is used for reading video data from a analog-to-digital converter or from a DVI to DVO converter and storing the image data in a separate memory. Additionally, it performs a compare operation between the current and the previously stored image and flags pixel blocks that have changed in-between. Furthermore, VSC 166 offers a processor interface, allowing a connected processor master-access to the image and the difference data stored in the attached dedicated memory. In an exemplary embodiment, VSC 166 is implemented with a EPIC12F324CS Altera Cyclone FPGA or it is implemented internally in integrated chip 100.

Controlling processor 112 sets VSC 166 to the proper modes and responds to interrupts generated by the device/integrated circuit 100. VSC 166 effectively reduces processor load while detecting the difference vector between two images and compressing image regions specified by the processors. VSC 166 performs image compression and assists the controlling processor in detecting the areas where image data has changed.

Figure 3:
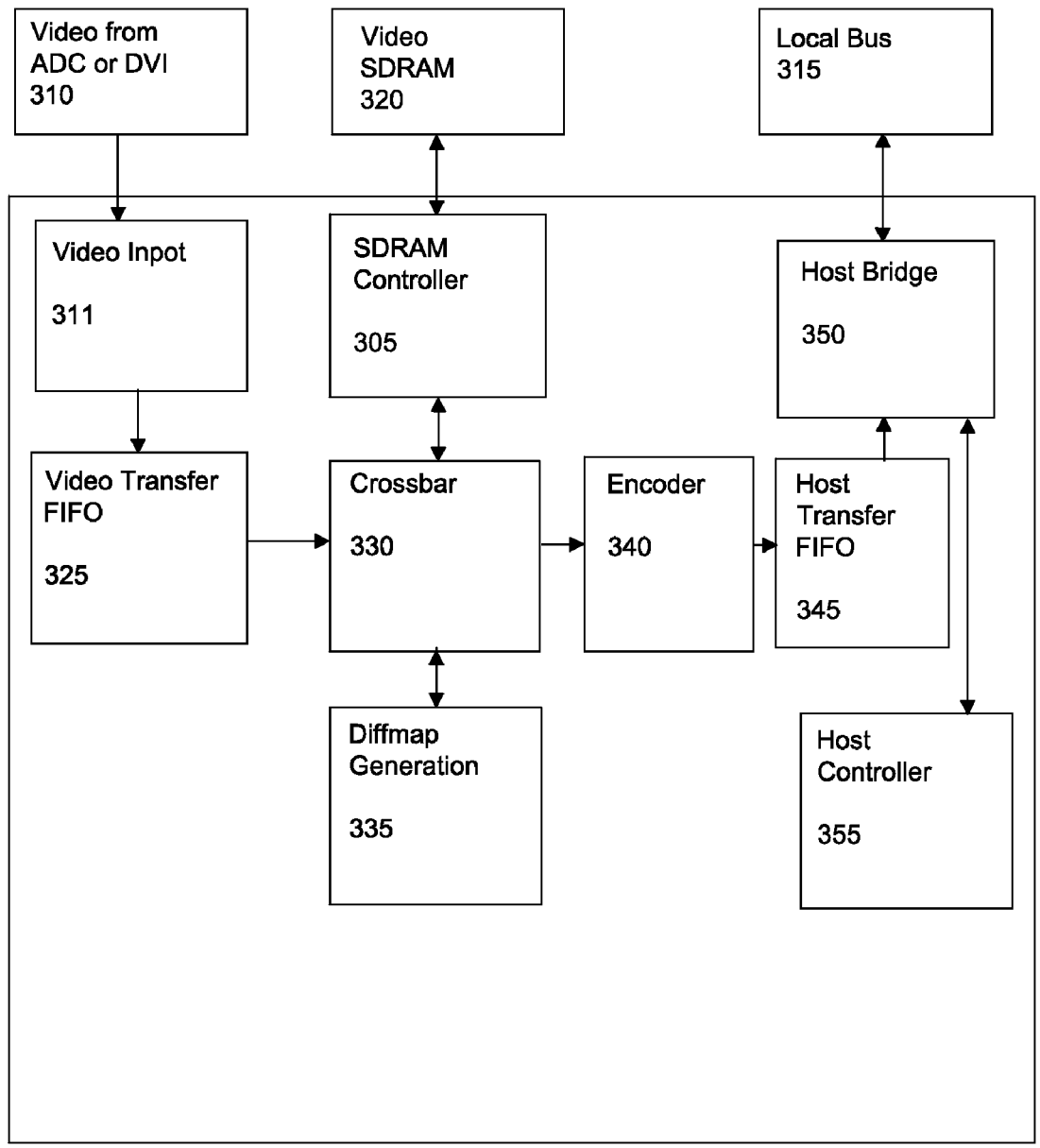
FIG. 3 is an exemplary functional block diagram of the video sampling controller.

Referring now to FIG. 3, there is shown a top level block diagram of VSC 116 with connections to a ADC 310, Video SDRAM 320 and local bus 315. VSC 116 includes a video input 311 feeding a video transfer FIFO 325. VSC 166 contains no master access support. The controlling processor 112 (also known as embedded processor) may access the device either directly as a master or by using DMA 132 to transfer data to host memory. FIFO 325 feeds a crossbar/switch 330, which in turn feeds and accepts data from a SDRAM controller 905 and a diffmap generator 335. SDRAM controller 905 is also connected to video SDRAM 320. Accesses to video SDRAM 320 are burstable, since the SDRAM 320 runs at a higher clock rate and can be prefetched.

VSC 166 has an internal bus system formed by video FIFO controller 325, diffmap generator 335, encoder 340 and SDRAM controller 305. The three masters are video FIFO controller 325, the diffmap generator 336 and the encoder 340. The one slave is SDRAM controller 305. The masters and slave are connected via crossbar 930 which handles master arbitration.

Switch 330 feeds data to encoder 340, which in turn feeds a host transfer FIFO 345. FIFO 345 is connected to host bridge 345, which communicates with local bus 315. Host controller 355 is connected to host bridge 350. In an exemplary embodiment, the parameters for the local bus connection 315 are 50 MHz bus clock, 16 bit bus width, burst- or no-burst-operation (where bursts are terminated by VSC 166 using Blast), 32 bit access, synchronous bus operation, peripheral device pacing with external ready signal, timeout counter support for ready assertion failure, and 16 Mbytes address range (8 Mbyte for image data and 8 Mbytes for register access).

In general, VSC 166 samples video image data to a dedicated SDRAM memory 320 (with the aid of an external video ADC 910 or with the aid of an external DVI to DVO converter or with the aid of an external VGA chip with a DVO output interface) and generates an image block difference map in SDRAM 320. It finds the image start position, the scan line length and the number of scan lines. It then generates interrupt requests to the controlling processor if video modes change or images differ from their predecessors. It takes into account various processing and signaling factors by measuring the duty cycle and frequency of external horizontal and vertical synchronization signals, measuring the accumulated image difference due to sampling position errors to fine-adjust the sampling clock, and measuring the period of the pixel clock. It performs color reduction, compresses hextiles from the requested transfer region, downscales the image for thumbnail generation, and transfers image data in raw, down-scaled or compressed form. Moreover, VSC 166 measures the on and off-duration of the vertical and horizontal synchronization pulses and generates an interrupt request for the controlling processor 112 if they change. It further detects the length of the horizontal and vertical scan length and scan start pixel position. The frequency of the pixel clock is measured and can be read by processor 112.

ii. Video Input Path

Referring still to FIG. 3, video input path characteristics are now described. The video input data format is 16 bits/pixel (RGB format in 565 sequence). There are 2 pixels per clock cycle, that is, it is a "double pixel format", with 32 bits per clock cycle. The smallest element of processing is a hextile, a rectangle of 16×16 pixels with a resulting size of 512 bytes. There are two input sources, an analog VGA signal sampled by an ADC or a digital DVI input.

VSC 166 obtains video data from a video analog-to-digital converter (ADC 310), such as for example, an Analog Devices ADC9888. ADC 310 can be operated in "double-pixel-mode", lowering the pixel clock by 50%. The maximum supported resolution is 1600×1200 pixel at 60 Hz refresh, resulting in a pixel clock of about 162 MHz. The sampling clock at VSC 166 is therefore 81 MHz. VSC 166 can operate SDRAM 920 at a higher clock-rate than the 81 MHz sampling clock of ADC 910. So VSC 166 should actually be able to achieve a higher refresh rate at 1600×1200 resolution. The VSC 166 can also get digital video data input from other digital video sources like DVI to DVO converter or VGA chips with an digital DVO input interface. VSC 166 supports double pixel mode as well as single pixel mode. It further supports double data rate and single data rate data transfer modes.

The video stream generated by ADC 310 is written into a dual-clockable FIFO 325 synchronously to the pixel-clock generated by ADC 310. FIFO 325 width is 32 bits, since two pixels are sent in one clock-cycle in "Dual Channel/Parallel Output" mode. Port B of ADC 310 carries the sample that precedes the pixel data on port A. The image formatting registers and counters are also clocked with the pixel clock. They enable the output of data into the FIFO 325 and remove the horizontal and vertical retrace intervals. The RGB data is reduced to 51615 bits, respectively. There are no completely black pixels. If a pixel has been found to be RGB=0/0/0 it will be changed to RGB=0/0/1. The value RGB=0/0/0 is reserved for the frame end marker. This information is used by VSC 166 to change from sampling to processing mode, as explained below.

The change of the clock domain is handled by the FIFO 325 for all image data and image synchronization. All other register signals have to be triple sampled/filtered to safely cross from one clock domain to the other. A general purpose output port named CLOCKINV is available to allow interlaced image sampling by the ADC 310 to be controlled by the processor.

The counters for line and image alignment are also used to continuously measure the position and size of the image in pixels or lines, respectively. The numbers obtained are relative to the pixel clock and should be used only if a proper pixel clock is generated by the ADC's PLL.

The duration of the high and low periods of the HSYNC and VSYNC signals from the VGA input are measured using a counter. The input frequency of the counter is 100 MHz, so that the counter value times 10 gives the period in nano seconds. A change of the measured values of more than a 100 ns will generate an interrupt, since it is assumed that the video mode changed. Horizontal resolution is measured by counting the number of pixel clocks between two HSYNC impulses. The vertical resolution is determined by the number of HSYNC impulses between two VSYNC impulses. Offset is measured by counting the number of pixels which are darker than a certain threshold after a sync impulse. This is not necessary for a DVI input as the signal "display enable" indicates valid pixels.

iii. Image Storage

Figure 4:
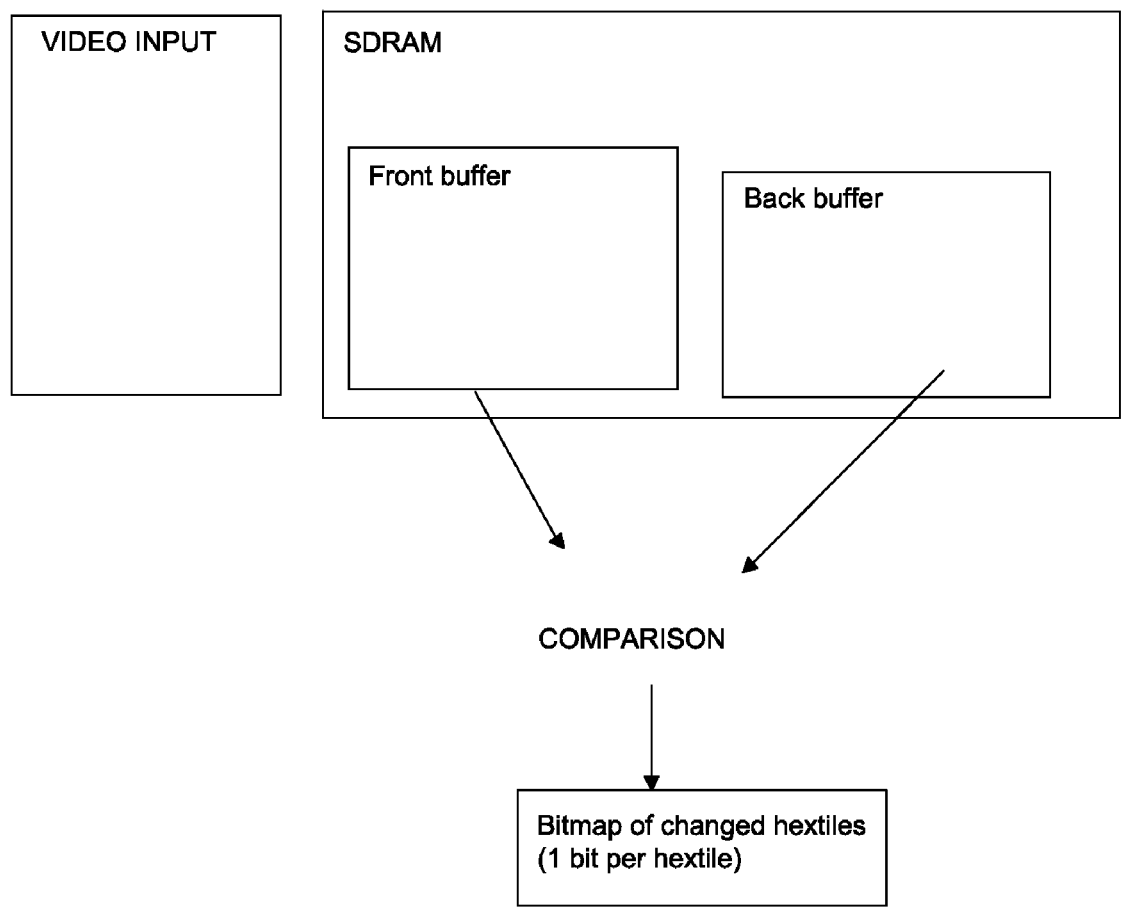
FIG. 4 is an illustrative frontbuffer and backbuffer for storing video input.

The image then needs to be stored. To store an image of 1600×200 pixels with 16 bit per pixel color depth 3,840,000 bytes are needed. Since two images must be available to detect differences between them, an 8 MByte SDRAM is used to create a first framebuffer and a second framebuffer as shown in FIG. 4. In an exemplary embodiment, a single data rate SDRAM is chosen for simplicity, cost and design risk reduction. SDRAM will be clocked at 100 MHz to have a CAS latency of 2 clocks. The required bandwidth of one double-pixel at 81 MHz or 32 bit at a rate of 81 MHz (2.6 Gbits/s) requires a 32 bit interface to the SDRAM, unless a double data rate SDRAM is used. The exemplary device is a 2M×32 bit single data rate SDRAM, offering almost 3.2 Gbits/s bandwidth. The SDRAM is organized as 512K×32 bit×4 banks. Each bank is 2048 rows times 256 columns time 32 bit. Therefore the row address is 11 bits, the column address is 8 bits and the bank address is 2 bits. The maximum burst size is thus 256 times 32 bits or 1024 bytes. To store an image of 3840000 bytes about 3750 page changes have to be performed. In-page read/writes take up 1 clock cycle as a page-sized burst. Page changes take x clock cycles. The required steps are shown in the following list:

PRECHARGE (close previously active row–wait $t_{RP}=$, 1+2 clocks),

ACTIVE (open row –wait $t_{RCD}$=20 ns, 1+2 clocks),

READ/WRITE (open column –wait $t_{CD}=$, 1+1 clocks –CAS delay 2),

Data Transfer

This means that for each page change 8 clocks have to be added $t_{image}$=3750·(8+256)=990000 [clocks]. The data rate is 3.103 Gbits/s in this case. This is higher than the source data rate of 2.6 Gbits/s. The overhead due to page changes is 3.12% assuming page sized bursts.

If the processor is accessing the SDRAM, the first access will be throttled using PER-READY. During that time the row/bank is opened. Since the processor's bus clock is only half the SDRAM clock, the SDRAM-burst has twice the data-rate of the local-bus. In this case it is advisable to not use bursts, but to use RANDOM READ/WRITE mode with prefetching within the page. Bursting to SDRAM would prefetch too much data and could not be sustained for long periods of time. The local bus, however, may burst until a page end is reached. Then the burst is terminated with PER-BLAST.

iv. VSC Data Flow

VSC 166 uses no busses but only unidirectional point-to-point data-lines. The central switching unit is called busswitch 330 (although the signals running to it are not really bus signals, since they are not shared by multiple devices). The protocol of the busses running between this central switch and the various masters that might access the slave device SDRAM is described in this section. Please note that the design is specialized for the case where multiple masters need to access a single slave (master and initiator or slave and target mean the same thing here). The masters accessing SDRAM are (in the order of their arbitration priority):

FIFO controller (highest priority),

Image processing engine, host controller (lowest priority).

There is a 4th master socket at the busswitch that is not used at the moment. Its request line is always low and it is used to park the slave bus on this master device. Instead of having bi-directional signals there are two data busses: one for reading and one for writing. The advantage of this is that no "line turn around" cycles are needed on these lines and device resources are saved.

The bus is synchronous and takes advantage of the fact that the propagation delay of flip-flops is typically higher than the required input hold-time. If the clock skew within the FPGA is higher than the difference between propagation delay and input hold-time, then the device will no longer work properly. Masters can only start read or write transfers. All transfers are considered to be burst transfers. The address is automatically incremented by the slave, so there is only one address phase. The address and data lines could be shared if the data transfer during write would take place one clock cycle later. This increases latency, but would also save FPGA routing resources.

FIG. 5 shows a typical read access. A number of things can be seen from the timing diagram. First of all, the start of an access is indicated by activating the req-line. The bus-protocol is synchronous. When a request is started, the address and the read-not-write signal must be valid until the request is granted by asserting the ack-line. When ack has been activated the slave will have latched the address and command and the address and read-not-write signals are "don't care" until the start of the next transfer.

The slave device will continue to burst data as long as the req-line is held active. It might happen, that the slave is not able to continue the burst (e.g. page change in SDRAM). In that case the slave will negate the ack-line, indicating a busy condition. The master, wanting to continue the transfer, holds req active continuously. When the slave is able to continue the burst, it will assert ack again. The signal ack indicates in all situations that the transfer of a read data word can take place in the current cycle. The slave will only increment its address counter if it asserted ack during this cycle. The master should implement the same behaviour. Releasing the req-line also indicates that the bus is no longer needed. A master can only posses the bus for the duration of a single burst. Rearbitration will occur after a bus release, which may re-grant the bus to the same master if it re-asserts req.

When the master has finished its transfer it should negate req. The arbiter will never remove the bus from a master that claimed the slave and is not releasing it. The arbitration scheme is co-operative, in other words the masters need to be designed to release the bus or other masters will not be able to access the slave. The latency from req to act is dependent on the priority of the master requesting the slave access and the duration of the burst of all masters with higher priority.

The efficiency of the protocol can be expressed as a ratio of data transfer cycles to the total number of cycles required. The access latency reduces efficiency, If the busswitch is idle, i.e. no other master has requested the slave bus, then the best-case latency of an access is $t_{AC}=1$. Additionally, at the end of each burst two cycles are wasted one to detect the end of an transfer and one for rearbitration. So for each burst there are at least 3 additional cycles. This makes bursting the only efficient transfer method. Single word access has an efficiency of only 25%. A full-page burst under realistic SDRAM timing parameters will have a mean $t_{AC}$ of 6.5 (varies due to refresh cycles that might be currently active) and two burst termination cycles. The efficiency in this case is 256/(256+6.5+2)= 96.79%.

FIG. 6 shows a typical write access. Writing has only some minor differences to reading. The signal ack has the same meaning here: It means that the data can be transferred in the current cycle and the master is requested to provide the data on the bi-port.

Using this simple protocol, masters can perform read- or write-bursts of arbitrary length. The slave can throttle the transfer rate if the burst can not be continued for some reason. Neither the slave nor the busswitch can disconnect the master, masters must limit their burst duration by design.

v. Video Memory Access

VSC 166 host controller 355 is used to access VSC 166 internal registers and video memory. Host controller 355 runs at 100 MHz along with the rest of the image processing hardware of VSC 166. The peripheral local bus is clocked with half the internal clock. So valid signal changes occur every other internal clock cycle and last two clock cycles. The 100 MHz PLL-output should be phase-adjusted so that the local bus clock can be used as an input to a register clocked with 100 MHz (setup- and hold-times are met). This register is then used as a local bus enable signal to change the state of the synchronous host controller logic. All register access can be performed in a single cycle. Register access can not be performed as a burst, PerBLast is set accordingly by the device.

The access to video memory is based on the concept of a block. A block is a rectangular area in video memory of W pixels width and H pixels height (block transfer size register, BTS). Starting from the address in the block transfer address register (BTA), VSC 166 will automatically calculate the memory addresses to transfer the pixel data for this block (based on BTA) and deliver double pixel words on a host read request. A rectangular field of blocks can be transferred as the horizontal width in blocks and vertical height in blocks (block transfer field register, BTF) and two offsets. One offset is used to obtain the start address of the next column of the block field (block column offset register, BCO) and the other offset is added to the position of the last block in a row to skip to the first block in the next row of blocks (block row offset register, BRO). The formulas to calculate BCO and BRO are:

$$BCO=BlockX\cdot BlockY\cdot XLength$$

$$BRO=FieldY\cdot XLength-FieldX\cdot BlockX$$

BlockX and BlockY specify the size of the tile/block in pixels (x value must be even since only double-pixels are transferrable). XLength is the number of pixels in one horizontal scan line (even, since double-pixels are used). FieldX and FieldY specify the size of a transfer field in tiles. Address calculations are only performed for starting addresses of bursts. Burst duration is timed using a burst length counter (typically BlockX/2). The next line in a burst is found by adding XLength to the current burst start address. The last line of a block is found by decrementing the BlockY value for each burst. Then BCO is added to find the address of the next block. The last block in a field line is found by decrementing FieldX for each block. Then BRO is added to find the address of the next block. If the blocks in a field line counter reaches zero and the rows in a filed counter is also zero, the transfer is stopped.

The block engine can also be programmed to perform linear read accesses by setting the block size equal to the screen resolution and transferring one block of memory. The block transfer address register (BTA) is then used as a start address and the block transfer size register (BTS) is then used to encode the count of words to transfer. The same rules as for block transfer apply.

While prefetching the data to be read by host controller 355, the data is also copied to the primary image storage in video RAM as a reference for further difference map calculations. The address of the write burst is found by using the address of the read burst and setting the highest bit to one.

The prefetch/write-back engine is coupled by a FIFO 345 with host controller 355. A write to the block transfer control register (BTC) flushes FIFO 345 and starts a prefetch with the new block parameters. The prefetch operation uses a RAM with the same size as the SDRAM page and writes the newly read words in this RAM back to primary storage in the background. The read data is also written to FIFO 345, that will be read by the host controller on access to the memory port.

Two data sources are available, a register file and a diffmap or compressed video data. The sources are multiplexed via an address bit. Video data is pushed into the Host Transfer FIFO 345 by the VSC core (specifically the encoder 310). Data from the FIFO 345 can be read through two ways. First, it can be mapped to a register and read by the controller 355. Second it can be directly read by a DMA engine, if available. Different host bridges are available to match specifics of different products.

vi. Diffmap and Encoder

Figure 7:
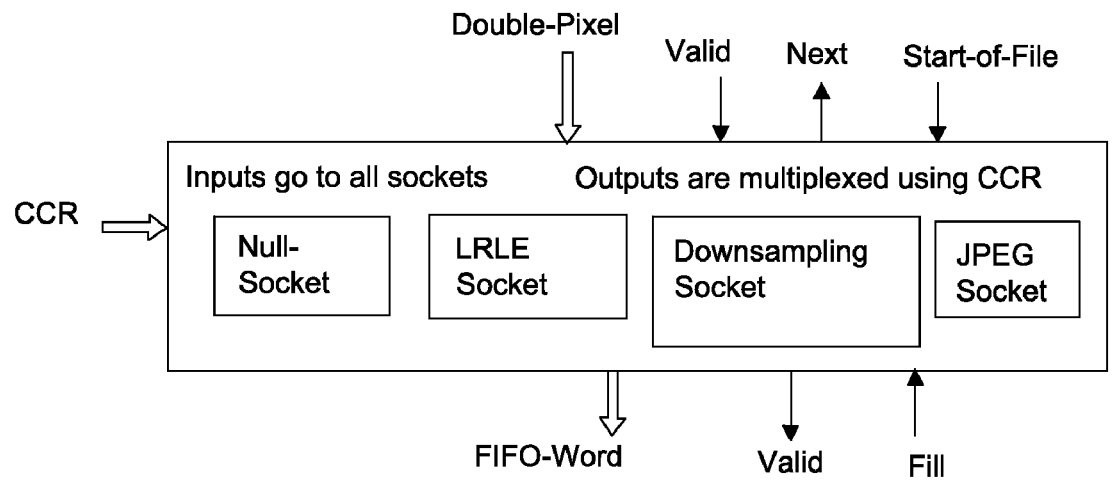
FIG. 7 is an exemplary top level socket diagram of the encoder module of the VSC.
Figure 9:
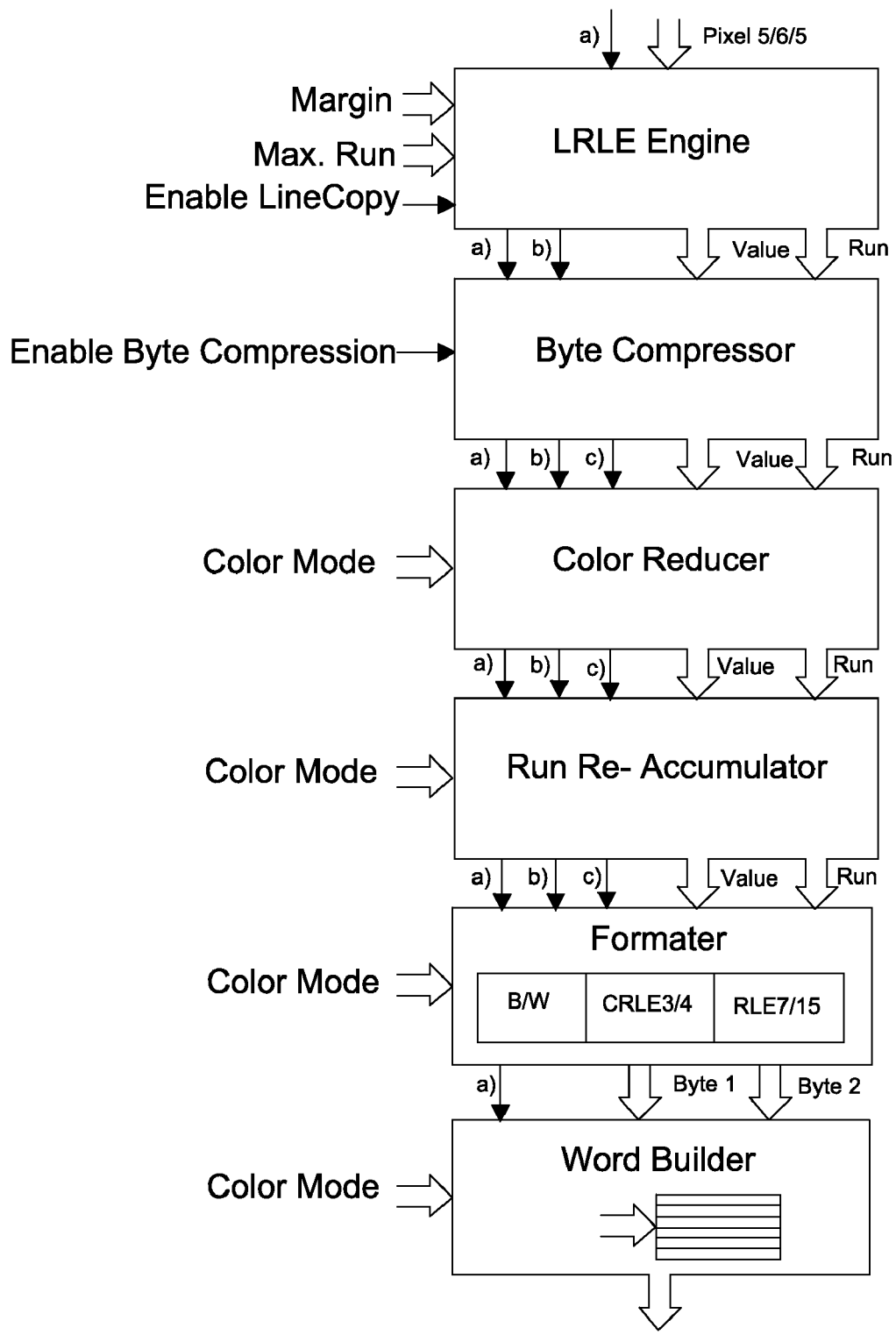
FIG. 9 is an exemplary flow diagram of an LRLE encoder process.

There are several encoders that can be used in encoder 340, including but not limited to, RAW, LRLE, downsampling and DCT. Different encoders are easily integrated into VSC 166 by establishing a well-defined interface with plugs into a common socket as shown in FIG. 7. In the RAW method, the data is directly transferred in hextile-wise formate to the host with no encoding. Downsampling, for example, is used for static screenshots in a web frontend. DCT/ICT is in general a colorspace conversion to YUV by subsampling color channels. It converts to the frequency domain and then uses quantization and Huffman coding methods. These methods are further discussed below.

III. Video Sampling Controller Operation and Flow

VSC 166 offers an on-chip compression engine. The transfer engine has 4 modes of operation: uncompressed data, downscaled uncompressed data, compressed data and DCT data. In each of the four cases the image data are passed through a separate engine.

i. Structure and Data Flow

Figure 8:
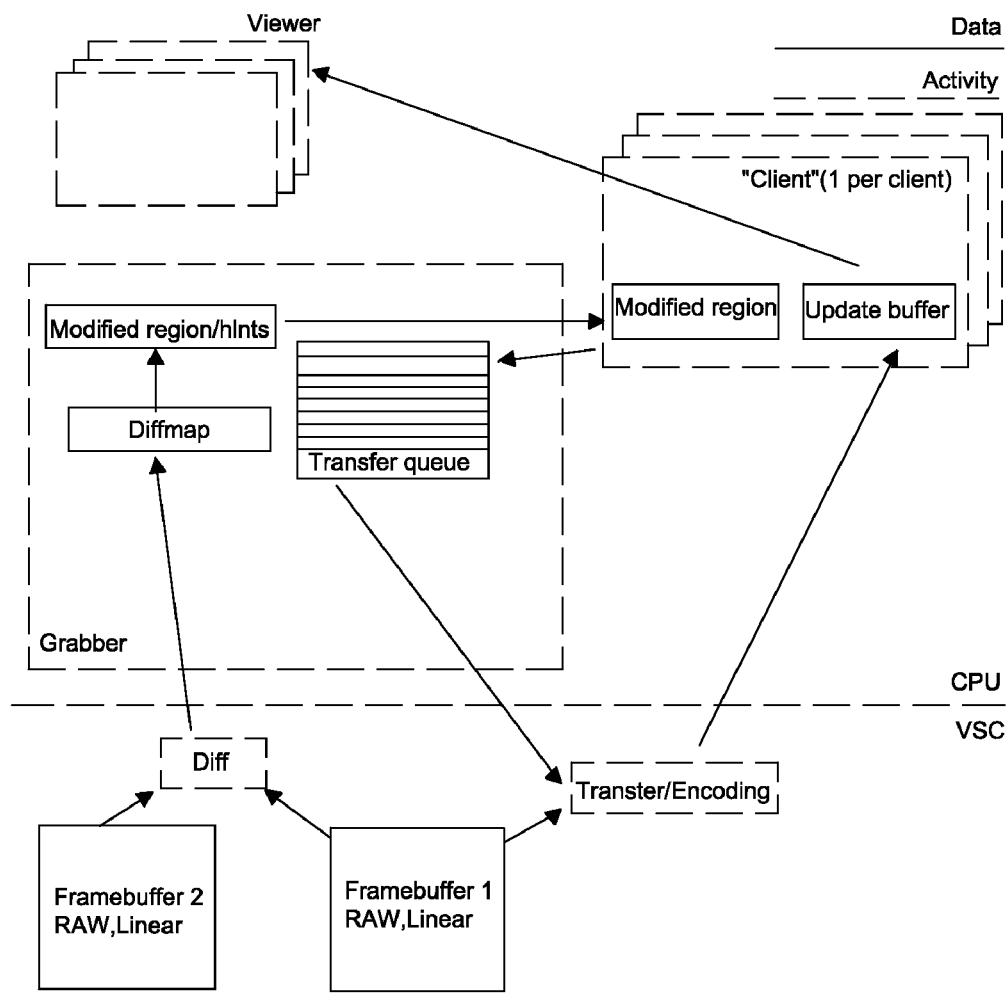
FIG. 8 is an exemplary flow diagram of the encoding and grabbing functionality.

The method doesn't use a single raw frame buffer in CPU memory. It uses a transfer-queue with requests for a number of screen rectangles for each client as shown in FIG. 8. All operations are hextile-based, this means they operate on a granularity of 16 pixels horizontally and 16 pixels vertically (a hextile). In general, a grabber/diff starts sampling a picture and building the difference map. Based on the diffmap, the grabber builds a list of modified regions. It notifies each client of the changed regions. The client merges it with their already existing modified region. Clients add requests for a part of their modified region (a number of rectangles) to a queue. At this stage the grabber reads the requests from the queue and transfers the requested data to the clients buffers. The maximum size of data to be transferred in a single run is limited by this buffers size. Slow clients may additionally specify a different compression mode or parameter settings (color reduction etc) in the request.

ii. DMA Transfer of a Requested Tile Block

Transfers of the modified framebuffer parts will be done in rectangles with a multiple of the tile size. Because the tiles are encoded on-the-fly during the transfer, their final size is not yet known when starting the DMA transfer for the requested block on the CPU side. The following method (described for a single block) is used to solve this problem:
1. program the VSC 166 for this block, VSC 166 starts transfer.
2. VSC generates 'data ready' IRQ (bit DTR in ISR) when output FIFO reaches a threshold.
3. CPU starts DMA with fixed length (according to the threshold) and waits for DMA IRQ. Meanwhile VSC continues to encode as soon there is free space in the fifo . . . and continues with 2.
4. when there is no more data to be encoded VSC generates an 'end of transfer' IRQ (bit EOT in ISR).
5. CPU reads 'fifo fill level' register, starts a final DMA with this size and waits for completion.

Currently, there is no DMA engine that can implement this method without CPU interaction. The method has the advantage, that it can be implemented on all target platforms, the VSC is a slave device in this case.

Alternatively, the VSC might maintain a scatter/gather list of buffer pointers and bus-master the data into host memory. This will be faster (not dependant on interrupt latency and CPU), but considerably more complex. In the first step, the above mentioned transfer mechanism will be implemented.

iii. Compression Algorithms and Compression Sockets

The compression control register CCR specifies which compressor should be used for the current transfer of data. The top two bits in CCR allow to address four different compressors. These compressors are plugged into sockets as shown in FIG. 6. Each compressor socket is identical and is activated by the address in CCR[31:30]. The Null-Socket passes the data straight through and so implements the behavior of the VSC1. Each multi-stage compressor needs to implement appropriate pipeline stall logic, since the pipeline may stall due to a number of reasons such as pipeline internal stall, output FIFO full stall, or input data underrun stall.

In each of the cases the input and output FIFO should be treated in a way that does not corrupt their contents. This is the responsibility of the compressor plug-in, with only small checks performed in the socket framework.

a. LRLE

Pixel Runs

Figure 10:
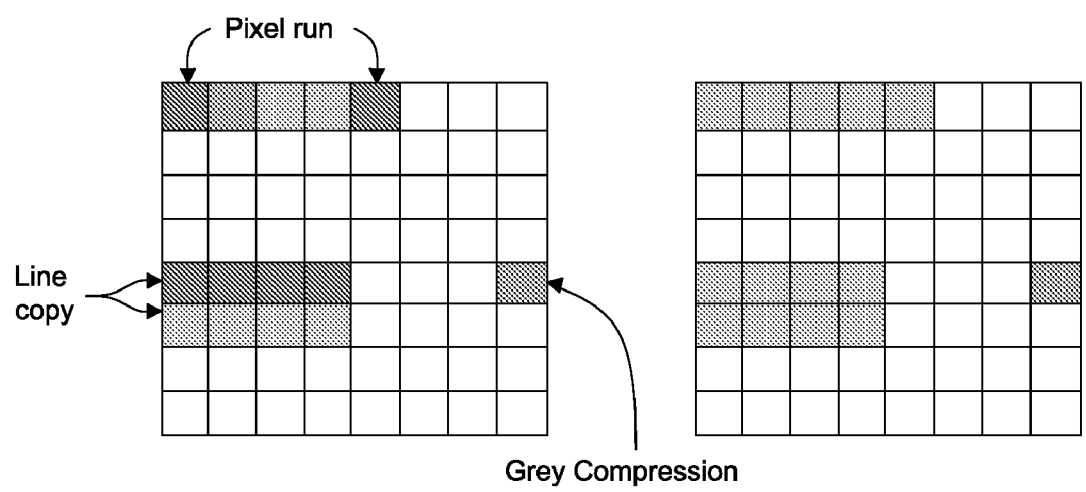
FIG. 10 are exemplary diagrams of pixel runs and line copy for the VSC implementation.

The essence of LRLE (Lossy Run Length Encoder) is to encode a block of pixels as a series of runs consisting of pixels that are almost equal. Refer to FIG. 10 for illustration. Specifically, a run is defined as a series of consecutive pixels 1 . . . n where:

$$MAX(red[n-1:0])-MIN(red[n-1:0])<=margin$$

$$MAX(green[n:0])-MIN(green[n:0])<=2\ margin$$

$$MAX(blue[n-1:0])-MIN(blue[n-1:0])<=margin$$

We apply the 2× multiplier on the margin for green because green has an extra bit of resolution (n=5).

Generally, a value of 1 works well for margin, although for some extremely compressed color spaces (e.g., black and white, and maybe 4-bit color), using a margin=2 helps compression a bit without having much impact on image quality. Using margin=0 would result in a lossless algorithm, which would produce beautiful output but with low compression ratios.

At the end of a run, we calculate the value of the run, i.e., the pixel value that will be used to represent the entire run of pixels, as the [average/last occurrence/first occurence] of the MIN and MAX of the red, green, and blue values encountered during the run. There are other ways to do this, but this approach seems to offer the best compromise of good image quality with simple implementation.

Note that a pixel run can (and often does) wrap around from the end of one scanline to the beginning of the next.

Line Copies

Line copies take advantage of the fact that, very often, computer screens have repetition from scanline to the next. Specifically, a line copy is defined as a series of pixels 1 . . . n, on scanline y, such that:

$$ABS(red[i,y]-red[i,y-1])<=margin$$

$$ABS(green[i,y]-green[i,y-1])<=2\ margin$$

$$ABS(blue[i,y]-blue[i,y-1])<=margin,\ i=1\ldots n$$

In other words, each pixel is almost equal to the one directly above it. Note that, like pixel runs, line copies can wrap to the next scanline. In this case, though, even though we are now on line y+1, we continue to use line y−1 as our reference, to avoid propagation of error.

Byte Compression

The final piece of the puzzle is byte compression. Normally, a pixel value that starts off as 16 bits (5/6/5) is eventually represented as a 15-bit value (5/5/5). We can take a shortcut, though, and encode values that are almost grey as a 6-bit value within a single byte. By doing so, we not only save a byte on the output, hut we also gain the ability to generate 64 greyscale values. We define a 5/6/5 pixel value to be almost grey if MAX(2.red,green, 2.blue)−MIN(2.red,green, 2.blue)<=3. This formula was derived empirically, and works well in practice.

LRLE Basic Method

The LRLE engine creates a run or line copy as follows. Starting from the current pixel, simultaneously look for a pixel run and a line copy (as defined above). Use whichever continues for longer to encode the pixels. Then start again from the next pixel after the run or line copy. If the pixel mm and line copy are the same length, use the line copy, as it is usually more efficient. As an example, suppose we are starting from pixel (x,y), As we progress down the scanline, we find that we have a pixel m from position x to position x+5. However, we also find that we have a line copy from position x to position x+8. Because the line copy is longer, we output a line copy of length 9, and resume encoding at position x+9.

End of Tile Markers

Because the length of the encoded tile is variable, we tack on an end-of-tile marker to delineate the end of the tile. This is defined as a sequence that will not otherwise occur in the data stream.

Trailing Line Copy Suppression

As a handy shortcut that gives additional compression when large contiguous blocks of color are encountered, we implement trailing line-copy suppression. This means that we chop off all line copies that occur just before the EOT marker. If the decoder encounters the EOT before it has filled out its output tile, it uses the line copy function to complete the tile.

Post Processors

The LRLE engine does its work fundamentally with 16-bit pixel data. To reduce the size of the output stream, post-processors are used to translate the pixel values into something smaller, and then reformat the output data using one of several formats as described below.

The advantage of this approach is that the LRLE engine is able to provide its noise-reduction before palette reduction occurs, which makes it much more effective. The post-processors are fairly simple, since they don't have to worry about margin, and how to detect line copies and the like. They simply take the intermediate-format run-length data and reformat it to something else.

FIG. 8 is a basic block diagram of the encoder. The individual blocks are described below and the signals are shown in Table 1 below:

TABLE 1

| Signal | Description |
| --- | --- |
| a) | End-Of-Tile indicator |
| b) | Line Copy active |
| c) | Grey Value |

LRLE Engine: Takes incoming pixel stream and converts it into a series of runs and/or line copies. Maximum run length, margin, and whether line copies are enabled are input to this block as programmable parameters. The output of this block is the description of a run, containing the following information:

1. The pixel value of the run (if not a line copy),
2. The length of the run,
3. Whether this is a line copy or a normal NU.

Byte Compressor: The next stage is the byte compressor, which indicates to the following stages whether the run value may be encoded as a grey byte value. It adds the "is grey" signal to the signals received from the LRLE engine. A value is defined as "almost grey", and therefore byte compressible, if the following condition is satisfied:

$$MAX(2.red, green, 2.blue) - MIN(2.red, green, 2.blue) <= 3$$

The asymmetry of the equation is due to green being 6 bits while red and blue are 5. If the "is grey" signal is asserted on output, the following stages will consider the grey value to be equal to the green channel (i.e, 6 bits.).

Color Reduction Engine: This block takes the incoming 16-bit run value and translates it into something smaller, be it 7 bit color, greyscale, 3 bits color, or whatever. The output is fed to the next stage.

Run Re-accumulator: After color reduction, it may turn out that there are successive short runs with the same run value. The run re-accumulator merges such runs, and outputs as many consecutive runs as necessary to encode the result. The maximum size of each run is based on the particular color mode being used. Note that no margin is employed here; consecutive runs must be exactly equal in order to be merged. This is a necessary outgrowth of the way the algorithm works, and bas the happy effect of making the re-accumulator extremely simple.

Output Formatters: Three output formatters are provided, based on the color mode selected RLE 7/15 Formatter: This block takes the run data from the re-accumulator and generates either RLE7 or RLE16-formatted output (which differ only in the number bytes used to encode the run values.) If consecutive runs share the same run value, the value is generated only for the first run ("repeat suppression"). For 7 and 15-bit modes, the end-of-tile marker is defined as the 2-byte sequence FE DF, which could not normally occur in the data stream.

CRLE 3/4 Formatter: This formatter is used for 2, 3, and 4 bit data using two distinct modes: 3-bit and 4-bit (2-bit data uses the 3-bit mode.) The two modes vary only slightly. Each nm or line copy is encoded as a single byte. For both 3 and 4-bit modes, the end-of-tile marker is defined as the single byte FF, which cannot normally occur in the data stream.

B/W Raw Formatter: For 1-bit (black and white) data, this block simply re-generates the raw bitmap, which compresses best using ZLIB. When black and white mode is used, Line Copies are disabled in the LRLE engine. No end-of-tile marker is provided in this mode, since the size of data for each tile is fixed and known.

Word Builder: Finally, the word builder takes codes from the selected formatter and assembles 32-bit words to be written to the output FIFO. In addition, it will generate the appropriate end-of-tile marker when the EOT indicator is given. As an extra function, the word-builder will track the last address of a non-line copy command written to the FIFO. When an EOT indicator is received, the marker is placed at the address following that one, effectively deleting all the trailing line copies that may exist for the tile. If the decoder encounters an end-of-tile marker before having reassembled the complete 16×16 tile, it finishes the tile with "implied line copies" the rest of the way. Note that, in order to implement this function, the word builder accesses the write side of the FIFO as a dual-ported memory.

RLE15 Format: Five different elements exist:

1. Word pixel value: This is a 15-bit RGB pixel value (5/5/5). It indicates that a single pixel of that value should be written to the output stream.

| Bit[15] | Bits[14:10] | Bits[9:5] | Bits[4:0] |
|---|---|---|---|
| 0 | Red[4:0] | Green[4:0] | Blue[4:0] |

2. Byte Pixel value: This is a 6-bit greyscale pixel value. It indicates that a single pixel of that value should be written to the output stream.

| Bits[7:6] | Bits[5:0] |
|---|---|
| 10 | Grey[5:0] |

3. Run length: This is a 5-bit value indicating that the last received pixel values should be copied N+1 times to the output. This means that each m length byte can generate up to 32 pixels on the output. Note that a run length cannot follow a line copy.

| Bits[7:5] | Bits[4:0] |
|---|---|
| 110 | Length, 0 (1 pixel) to 31 (32 pixels) |

4. Line copy: This is a 5-bit value indicating that the next N+1 pixels should be copied from the scanline directly above the current one. Note that line copies cannot appear on the first scanline of a cell.

| Bits[7:5] | Bits[4:0] |
|---|---|
| 111 | Length, 0 (1 pixel) to 31 (32 pixels) |

5. End-of-Tile marker: This is simply the 2 byte sequence FF DF.

RLE7: Format This format is identical to RLE15 except for the pixel value, which is a single byte as follows:

| Bit[7] | Bits[6:5] | Bits[4:2] | Bits[1:0] |
|---|---|---|---|
| 0 | Red[1:0] | Green[2:0] | Blue[1:0] |

CRLE4 Format: The 4-bit Compact LRE format contains 3 elements, as follows:

1. Pixel run: This is a byte containing a 4-bit pixel value and a 4-bit run length. The maximum run length allowed is 13 (1 101) which actually translates into 14 pixels.

| Bits[7:4] | Bits[3:0] |
|---|---|
| Length, 0 (1 pixel) to 13 (14 pixels) | Value |

2. Line copy: This is a byte starting with ?I 1 I?, and finishing with a line copy length up to 30 (indicating 31 pixels).

| Bits[7:5] | Bits[4:0] |
|---|---|
| 111 | Length, 0 (1 pixel) to 30 (31 pixels) |

3. End-of-tilemarker: This is simply the byte FF.

CRLE3 Format: This is identical except for the Pixel Run element, which is formatted as follows:

| Bits[7:3] | Bits[2:0] |
|---|---|
| Length, 0 (1 pixel) to 27 (28 pixels) | Value |

Color Modes

The supported color modes can be found in Table 2

TABLE 2

| Code | Color Mode |
|---|---|
| 0 | 15 Bit Direct Color |
| 1 | 7 Bit Direct Color |
| 2 | 4 Bit Direct Grey |
| 3 | 4 Bit Palette Color |
| 4 | 3 Bit Direct Grey |
| 5 | 3 Bit Palette Color |
| 6 | 1 Bit Direct Grey |
| others | Reserved | b. Downsampling

Thumbnail Generation

Four pixels from each scanline are merged to a single pixel (average value). Only every fourth scanline from a hextile is processed. Output is 4 by 4 pixel values for each hextile. Future versions may calculate the average over the 4 by 4 region that is represented by a single output pixel.

c. DCT/JPEG

Video Applications

Rectangular areas are compressed as a jpeg image.

d. Alternate Embodiment

The Linewise Method

In general, the used compression algorithm uses a combination of compression approaches, since each single approach has its weaknesses. The four used approaches are: run length encoding, palette reduction, using data from the previous line, and if none of the above methods leads to a reduction in size, then uncompressed image data.

The compression is applied only to a 16 pixel line of data. The reason for this is the 16 by 16 size of the hextile and the size of the SDRAM burst. If the tile size is increased to 32×32, the compression ration for typical desktop images is about 113 higher. However, for natural images increasing the tile size does not offer a advantage in terms of compression ratio.

Encoding

VSC supports hardware encoding of video bitmap data. All operations specified in this section work on a single hextile with a size of 16×16 pixels. Hextiles may be grouped to rectangles (blocks) of tiles horizontally or vertically (see TODO), but encoding is done for each of them separately. In case the current screen resolution is not a multiple of the tilesize, tiles are padded accordingly. The encoding itself operates on a linewise granularity, thats why its called the "linewise encoding". Each line starts with an encoding description byte, specified in table 4.2. The encoding description byte is always byte-aligned. No matter how long the result of the last line encoding is, a new line or tile always starts at byte boundary. A special case is the integration of a JPEG-like DCT based mechanism for the whole hextile. Each line is encoded using a single code. The first byte of the code and the context data (color depth) indicate the size of the code. Codes that are not sized an integer multiple of 8 bit are padded to 8 bits boundaries.

Color Reduction

The output of the encoding may have different color depths, i.e. the number of bits used for a color value is variable. The color-depth is not part of the encoded output data, but has to be known from the encoding context.

There are two different color modes for color reduction. Direct/true color mode achieves its target size by cutting the lowest significant bytes. Table mode uses a color table. For each pixel the difference to each entry of the color table is calculated and the nearest color value is used.

With grayscale reduction to the 6 bit target the luminance of each pixel is calculated (R+WB) with the color components being weighted differently (0.3 R, 0.59 G, 0.1 1 B). The luminance is then quantized to the target size. Lower target depths are handled with a color table as described in the paragraph above.

Compression Methods

Two different compression methods are applied intra-line compression and extra-line compression. him-line compression is concerned with the pixels in one line, whereas extra-line compression tries to use the fact that consecutive lines may contain the same data. The reason for this distinction is that intra-line compression is easier to handle in hardware and that extra-line compression can be thought of as an add-on to intra-line compression, thereby reducing complexity without sacrificing the option of exploiting vertical redundancy. See Table 3 for a list of used symbols in the compression description.

TABLE 3

| symbol | meaning |
|---|---|
| C | color depth (bits per pixel) |
| n | number of RLE runs |
| p | palette size (number of colors in palette) |
| m | number of RAW pixels |

Extra-Line Compression

Full line copy (FC): Whenever a number of lines are equal to the last one (under consideration of the fuzzy color threshold) a single encoding byte for these lines with the number of times to repeat is sent. The 4 LSBs of the encoding byte specify the number of equal lines. The full line copy subencoding decreases the number of lines and hence the number of encoding bytes sent for a single hextile.

Partial line copy (PC): For each of the following intra-line encodings, pixels also may be copied from the last line. Bit 5 in the encoding byte determines if 2 bytes with a copy bitmap follow. If this is the case, each bit set in the following 2 bytes means the according pixel will be copied from the last line. Pixels which can not be copied are encoded by one of the actual intra-line encodings. The encoding is applied only to the non-copied pixels, so this splits and shuffles the line into old and new pixels during the encoding.

Intra-Line Compression

RLE is a one-dimensional run length encoding here, maximum length is one line of the tile size length. The 4 LSBs of the encoding byte specify the number of runs. A single run consists of the number of pixels followed by color value, size depending on the color depth. The number of pixels is encoded in 4 bits, the color size depends on the target color depth, the resulting number of bits per run may be 20, 12, 10, 8, 6 or 5. The number of bytes following the encoding type byte are $(n*(4+C)+7)/8$. The RLE encoding in detail:

1 byte (encoding byte): 4 LSBs determine the number of runs
2 byte partial copy map, if bit 5 in byte 1 is set
runs, size=$(n*(4+C)+7)/8$ Palette Reduction (PR): Palette reduction counts the number of different colors in a line and encodes the pixel as a lookup in a per-line color table, thereby reducing the number of required bits to encode a single pixel. The palette reduction in detail:

1 byte (encoding byte): 4 LSBs determine the number of colors in the palette (p)
2 byte partial copy map, if bit 5 in byte 1 is set
color palette, size=$(C*p+7)/8$
bitmap, size=$((16*ceil(lb(p))+7)/8$ Raw encoding outputs the plain pixel data in the target pixel size.

1 byte (encoding byte): 4 LSBs determine the number of pixels following in raw encoding
2 byte partial copy map, if bit 5 in byte 1 is set
pixel data, size $(m*C+7)/8$ e. VSC Theory of Operation The chip first samples an initial image to its secondary storage. Then it initializes the difference block map to "all blocks changed", since its primary storage contains illegal data. The host processor is now required to read all changed blocks. While transferring the blocks to the host, the blocks are copied to the primary storage. Now the chip and the host are synchronized.

During normal operation, VSC 166 samples images to secondary storage. Then the block difference between primary and secondary storage are calculated and a block difference map is created. If there are changed blocks at the end of the operation, the host is sent an interrupt request. The host reads the difference map and then the indicated image data. When the image data is read from the secondary storage, the primary storage is updated in the background. After the read operation has been completed, the host may restart the consecutive sampling and difference calculation operations. If there are no differences, the host will not be interrupted. If the host does not read all changed blocks, then an interrupt request after the next sampling/difference operation is a certainty, since the primary storage is only updated by data transferred to the host.

The block size is defined as 16×16 pixels. The block difference map is located at physical address 0xffe00 (word address, equal to 0x1ffc00 pixel address or 0xeff800 byte address) and contains a maximum of 1600/16·1200/16=100.75=7500 bits. The storage size for the block difference map is less than 240 32 bit words or one SDRAM page. 2 SDRAM pages are reserved for block map storage to allow later increase in resolution. The transfer of image data to the host is optimized for block read operations. The start address of a block needs to be set and the next 16 pixel (8 words) are prefetched. These pixels are then written to the primary storage. Then the horizontal line width is used to calculate the address of the next block line and the next 16 pixels are prefetched and written. This operation will continue until all 16 lines of a block are prefetched. The host can then use consecutive accesses to the FIFO register to access the prefetched data in a single burst. VSC 166 needs less than 480 cycles (240 local bus cycles) to completely prefetch and write-back the data. The actual transfer to the host will take 16 bursts of 8 words (min. 160 local bus cycles). The operation is device paced by per-ready. Since the operation of VSC 166 starts when the block address register is written and the host can start reading data when VSC 166 is still prefetching the later part of the block, the two operations may occur simultaneously.

Phase 1 is the sampling to secondary storage, started by the host or the image processing engine. Phase II is the calculation of the difference block bitmap between primary and secondary storage. If there is no difference between the two images, the sampling phase is started again automatically. Otherwise and interrupt is sent to the host processor and the transfer phase is entered. Phase III is the transfer of image data to the host and update of the primary storage. The host reads the difference bitmap first and then decides which blocks should be read. The host may restart image capture and the VSC 166 enters the sampling phase again.

The block size can be changed, however 16×16 pixels is thought to be close to the optimal size. Increasing the block size allows longer bursts in the transfer phase. Smaller blocks lead to increased overhead hut may reduce the transferred amount of data if the change sets are small. At high resolutions the change sets tend to be larger, since mouse cursor and font size increase in size. A further optimization might be a block count register, that allows the continued transfer of multiple consecutive blocks without writing to the block address register again. This might allow longer periods of unattended DMA operation but is not necessary in the first silicon.

The handling of resolutions that have not an integer multiple of blocks in vertical or horizontal resolution requires special attention. First of all, all resolutions should have an integer multiple of blocks per horizontal line. This is the case for 640, 800, 1024, 1200, 1536 and 1600 pixels per line. Other resolutions that don't fulfill this requirement should be increased to the next integer multiple of 16.

Vertically, the image will be padded by "ghost lines" that only serve as a difference value set. The resolutions with 480, 768, 1024 and 1200 lines are no problem. The resolution with 600 lines will be handled as if having 608 lines for the calculation of difference maps and transfer to the host. The video memory in the host should be padded accordingly.

f. Controlling State Machine

Figure 11:
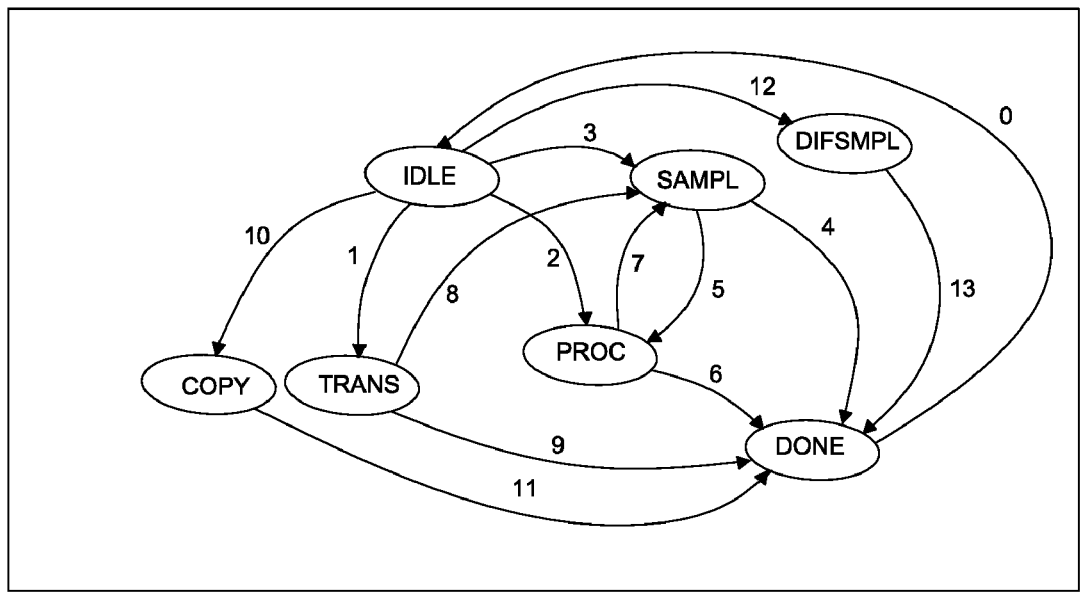
FIG. 11 is an exemplary state diagram for VSC.

Referring to FIG. 11, a state diagram is shown that illustrates flow control in VSC 166. Specifically, VSC 166 is mainly controlled by two registers which control the main state machine, the control register (CR) and the status register (SR). The control register tells the VSC the state transitions to do and the status register reports the current state.

The operation of the chip is determined by the contents of the control register (CR). In this register, certain paths in a finite state machine can be enabled or disabled. This allows the user to specify single operations or an almost automatic behavior of the chip. The state machine has 5 states and 10 valid paths, enumerated 0-9.

These paths can be individually enabled by writing the corresponding bits to the control register. The paths that can be taken are specified for each state separately. The operation of VSC 166 in each state is described in the following list:

IDLE: VSC 166 doesn't do a thing except measuring the vertical and horizontal image size and sync frequencies.

SAMPL: VSC 166 waits for the start of a new frame and samples the pixel data to SDRAM.

PROC: VSC 166 compares the images in the primary and secondary storage and generates a difference block map.

TRANS: VSC 166 takes the parameters of the registers controlling the transfer engine and starts to fill the prefetch FIFO and copies the transferred data to the secondary storage.

COPY: VSC 166 takes the parameters of the registers controlling the transfer engine and starts to copy the data to the secondary storage.

DONE: The stable state after operations have completed. Prevents a restart from IDLE since control register still contains the old value.

DIFSMPL Difference map update during sampling. VSC 166 will sample and calculate the diffMap in real-time. If there is a change in the image, the state changes from DIFSMPL to DONE.

These 5 states are sufficient to implement the operation of VSC 166. The processing of the state changes are now explained for each state:

IDLE state: 3 bits are used to encode the next state: 000 IDLE, 001 SAMPL (path 3), 010 PROC (path 2), 011 TRANS (path 1), 100 COPY (path 10) and 101 DIFSMPL (path 12).

SAMPL state: 1 bit determines if the next state after an image has been written to SDRAM is DONE (bit=0, path 4) or PROC (bit=1, path 5).

PROC state: 1 bit determines if the next state is SAMPL (path 7) if the difference block map did not contain any changed blocks (1). Otherwise (bit is 0 or block changes) the next state is DONE (path 6).

TRANS state: 1 bit determine if the next state after transferring all data to the host FIFO is DONE (bit=0, path9) or if the sampling is started again (bit=1, path=8).

DONE state: this state can only be left if all the above mentioned bits are reset to 0. Therefore, VSC 166 will remain in DONE until software allows transition to IDLE (path 0). Entering DONE generates an interrupt request.

This simple scheme allows flexible control of VSC 166. Simple paths like IDLE→SAMPL→DONE are possible, but also much more complex paths like IDLE→SAMPL>PROC→SAMPLE→PROC→DONE or IDLE→TRANS 3 SAMPL→PROC→SAMPL→PROC→DONE. Five bits control the behavior of the chip.

f. VSC Module Operation

Figure 12:
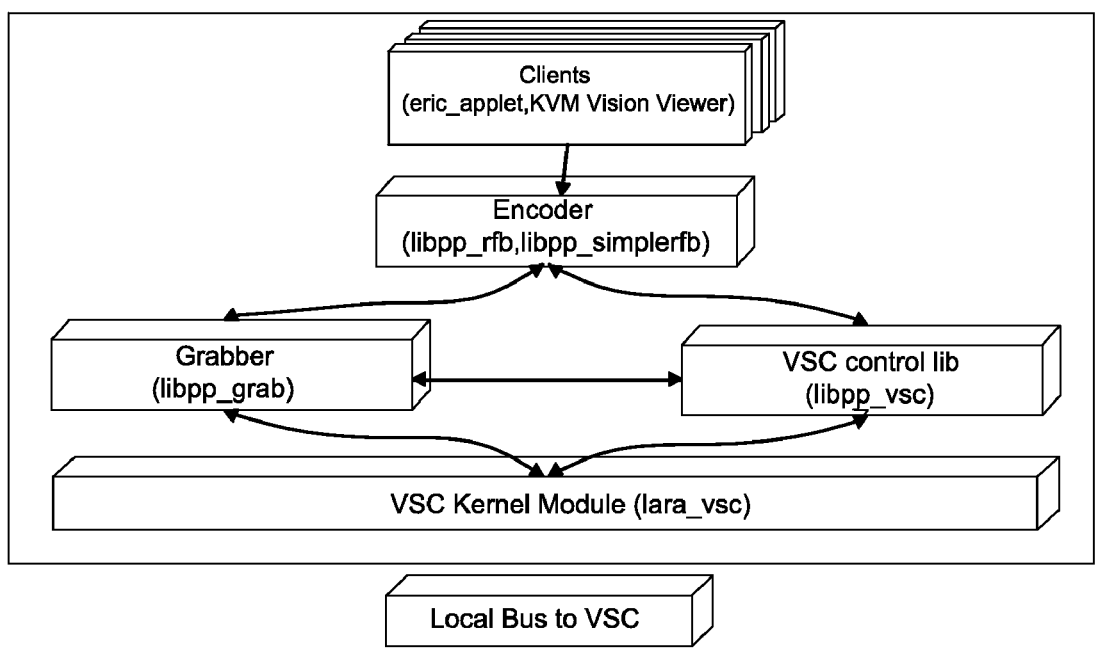
FIG. 12 is an exemplary module description and flow of the VSC.

Referring now to FIG. 12, a high level functionality of the kernel module includes picture offset/length measurement, measurements for auto adjustment ADC clock/phase, sampling a picture, creating a diffmap and transferring requested data to a client buffer. The lower level functionality includes mapping VSC register space, IRQ handlers, providing register access to VSC for VSC control library and reservation of physically continuous memory for client buffers.

Figure 13:
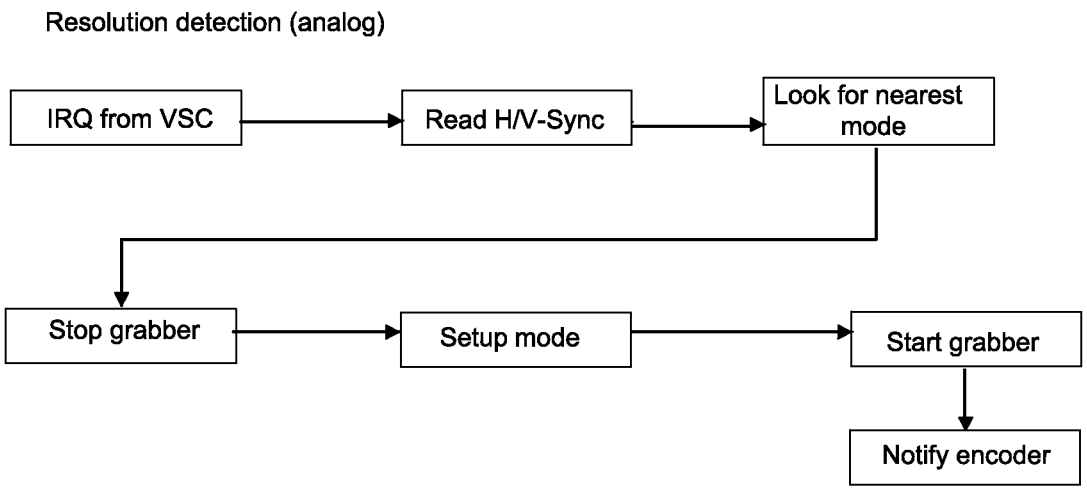
FIG. 13 is an exemplary resolution detection illustration for the VSC.
Figure 14:
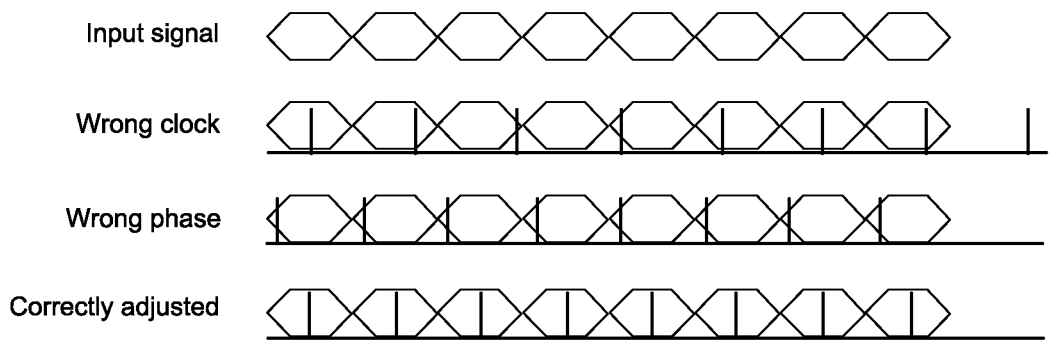
FIG. 14 is an illustrative diagram of out-of-phase and corrected signals for the VSC.
Figure 15:
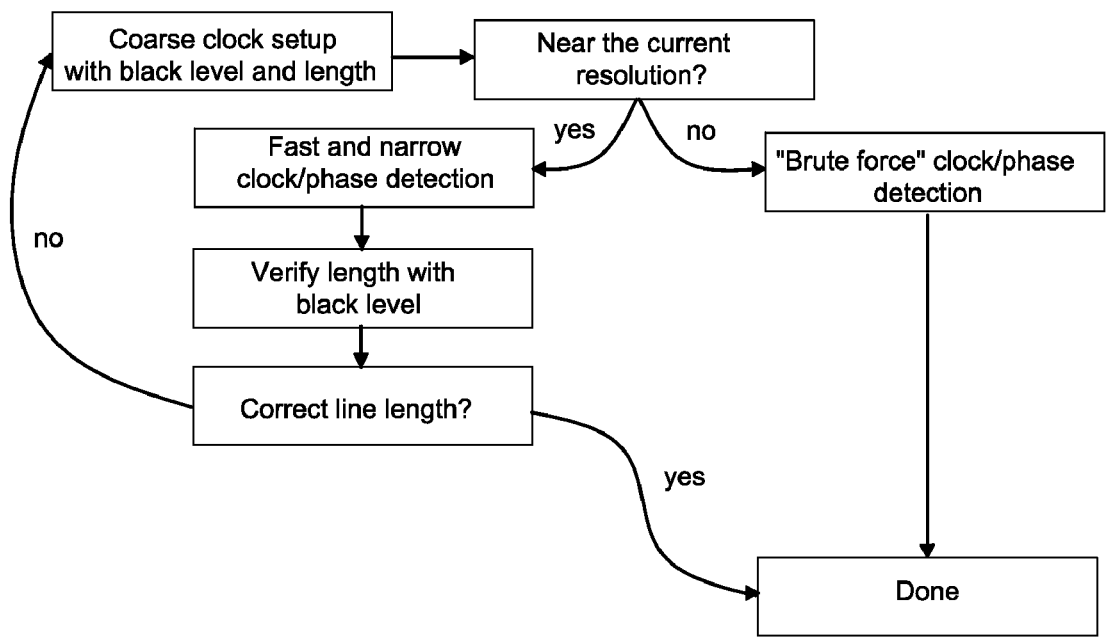
FIG. 15 is an exemplary flow diagram for the auto adjustment process.

The VSC control library performs VSC initialization, resolution detection, ADC control and video settings and auto adjustment of ADC clock/phase. Analog resolution is shown specifically in FIGS. 13-15. The ADC auto adjustment sets up the ADC PLL such that it is correctly synched to the clock and the phase of the video input signal. This is needed as incorrectly adjusted signal leads to noise. For a number of clock/phase combinations the overall noise in the frame is measured using the "image rescan error". The combination with the least error is used. See in particular FIGS. 14 and 15.

Referring back to FIG. 12, the grabber module is a separate thread which triggers sampling, difference calculation and transfer to clients round-robin. VSC creates a difference bitmap (1 bit per hextile), which is converted into a region (list of rectangles). A global (not client specific) diff region representing the difference between VSC front and back framebuffer.

Figure 16:
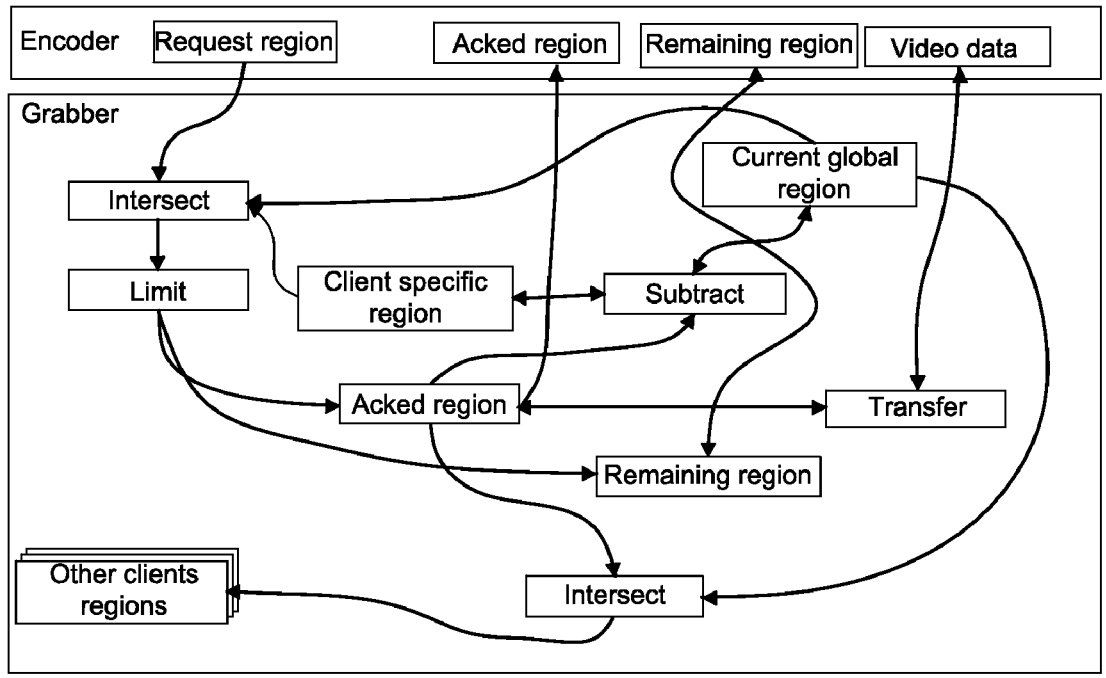
FIG. 16 is an exemplary illustration of encoder and grabber command and data flow in the VSC.

Referring now to FIG. 16, the handling of the global and client specific difference regions is described. A client requests a part of a video image (region). After this request the innovative software in FIG. 15 calculates the intersection between the requested region and the union of global and client specific difference regions, which itself is the history of changes in the video image over time. The result of this calculation is a temporary region used for further processing, starting with a step limiting the size. Here the region is limited so the worst case size of the encoded video data does not exceed the client's available buffer space. In this step the region is split in an acknowledged region and a remaining region. Only the acknowledged region is taken into further consideration, the remaining one is given back to the requester to be requested again at a later time. The acknowledged region is then used to transfer the video data, i.e. all rectangles in this region are requested from the encoder part of the VSC, encoded and delivered to the client's buffer space. This transfer also updates the secondary framebuffer in the VSC, thus after the data is transferred the according tiles will not lead to a difference again. This must be taken into consideration in a multiple client scenario where other, slower clients also require this video data. So as a last step the acknowledged part is removed from the global difference region and added to other clients difference region history. This way no changes in the video image get lost for slower clients.

Video data transfer is client triggered and control flow is implemented by: 1) clients send requests for framebuffer update to encoder. Encoder requests data from grabber and sends it to client. Client issues the next request not before receiving the data. The line bandwidth is addressed and flow control is implemented. Slow lines having intermediate video input changes are not shown.

While the foregoing description and drawings represent the preferred embodiments of the present invention, it will be understood that various changes and modifications may be made without departing from the spirit and scope of the present invention.

What is claimed is:

1. An integrated circuit, comprising:
    a microprocessor;
    a video sampling controller operating with the microprocessor to accelerate video processing and compressing; and
    access circuitry coupled with the microprocessor and the video sampling controller to control access and management of remote devices, the access circuitry including at least one bus, general-purpose input/output (I/O) circuits and memory circuits, wherein
    the video sampling controller further comprises a grabber for calculating a difference map between a first buffer and a second buffer and generating a list of modified regions from sampled data and an encoder for compressing the modified regions and transferring compressed modified regions to a client,
    wherein the encoder determines longest pixel runs and line copies from pixel streams corresponding to the sampled data, and
    wherein the encoder applies greyscale compression if a run value satisfies predetermined criteria.

2. The integrated circuit of claim 1, wherein the encoder applies a color reduction process to decrease size.

3. The integrated circuit of claim 1, wherein the encoder runs are -accumulator to merge short runs that match as a result of encoder processing.

4. The integrated circuit of claim 3, wherein the encoder applies a color reduction process to decrease size.

5. The integrated circuit of claim 1, wherein the access circuitry includes an integrated universal serial bus (USB) high-speed device and an on-the-go (OTG) interface with a built-in USB physical layer controller (USB-PHY) to provide integrated keyboard, mouse and mass storage emulation.

6. The integrated circuit of claim 5, wherein the access circuitry includes an integrated encryption controller to ensure secure remote management sessions.

7. The integrated circuit of claim 6, wherein the access circuitry includes intelligent platform management interface (IPMI) compliant interfaces.

8. The integrated circuit of claim 1, wherein the grabber detects and flags pixel blocks to generate the difference map.

9. The integrated circuit of claim 1, wherein the video sampling controller generates requests to the microprocessor for detected changes and adjusts the sampled data for phase and sampling errors.

10. The integrated circuit of claim 1, wherein the grabber compares sampled data against previously stored sample data.

11. The integrated circuit of claim 1, wherein the encoder compresses the modified regions using a selected encoding scheme.

12. The integrated circuit of claim 1, wherein the encoder compresses the modified regions using a lossy run length encoder.

13. The integrated circuit of claim 1, wherein the encoder compresses hextiles corresponding to the modified regions.

14. The integrated circuit of claim 1, wherein the pixel run is determined by looking for consecutive pixels that are equal within a predetermined margin and setting a pixel value for all such pixels based on a predetermined statistic.

15. The integrated circuit of claim 14, wherein the line copy is determined by looking for pixels on neighboring scan lines and assigning an identical value to all such lines if a predetermined criteria is met.

16. A method for accessing and managing remote devices, comprising the steps of:
    providing access circuitry to control access and management the remote devices, the access circuitry including at least one bus, general-purpose input/output (I/O) circuits and memory circuits;
    sampling and storing video image data from the remote devices using a video sampling controller in conjunction with a processor to accelerate video processing and compressing;
    calculating a difference map between a first buffer and a second buffer and generating a list of modified regions from sampled data;
    encoding the sampled data by compressing the modified regions and transferring compressed modified regions; and generating requests from the video sampling controller to the processor for detected changes and adjusting the sampled data for phase and sampling errors, wherein the step of encoding further includes the steps of:

determining longest pixel runs and line copies from pixel streams corresponding to the sampled data, wherein the pixel run is determined by looking for consecutive pixels that are equal within a predetermined margin and setting a pixel value for all such pixels based on a predetermined statistic and wherein the line copy is determined by looking for pixels on neighboring scan lines and assigning an identical value to all such lines if a predetermined criteria is met, applying greyscale compression if a run value satisfies predetermined criteria, applying a color reduction process to decrease size, running a re-accumulator to merge short runs that match as a result of encoder processing, applying a color reduction process to decrease size, and formatting the output.

17. The method of claim 16, wherein the step of calculating includes the step of comparing sampled data against previously stored sample data.

18. A remote management system, comprising:

a microprocessor;

a media co-processor operating with the microprocessor to accelerate video processing and compressing;

access circuitry coupled with the microprocessor and the media co-processor to control access and management of remote devices, the access circuitry including at least one bus, general-purpose input/output (I/O) circuits and memory circuits;

a grabber for calculating a difference map between current sampled data and previously stored data and generating a list of modified regions from sampled data; and an encoder for compressing the modified regions and transferring compressed modified regions to a client, wherein the encoder further includes:

a first module for determining longest pixel runs and line copies from pixel streams corresponding to the sampled data;

a second module for applying greyscale compression if a run value satisfies predetermined criteria;

a third module for applying a color reduction process to decrease size;

a fourth module for running a re-accumulator to merge short runs that match as a result of encoder processing; and a fifth module for applying a color reduction process to decrease size.

19. The remote management system of claim 18, wherein the access circuitry includes an integrated universal serial bus (USB) high-speed device and an on-the-go (OTG) interface with built-in USB physical layer controller (USB-PHY) to provide integrated keyboard, mouse and mass storage emulation, an integrated encryption controller to ensure secure remote management sessions, and intelligent platform management interface (IPMI) compliant interfaces.

* * * * *